US012154474B2

(12) United States Patent
Liao et al.

(10) Patent No.: US 12,154,474 B2
(45) Date of Patent: Nov. 26, 2024

(54) BRIGHTNESS COMPENSATION DEVICE AND BRIGHTNESS COMPENSATION METHOD

(71) Applicant: AUO Corporation, Hsin-Chu (TW)

(72) Inventors: Shu-Wen Liao, Hsin-Chu (TW); Ti-Kuei Yu, Hsin-Chu (TW); Yen-Wen Fang, Hsin-Chu (TW); Ya-Ling Hsu, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/496,965

(22) Filed: Oct. 30, 2023

(65) Prior Publication Data

US 2024/0321164 A1 Sep. 26, 2024

(30) Foreign Application Priority Data

Mar. 24, 2023 (TW) ................................. 112111290

(51) Int. Cl.
*G09G 3/20* (2006.01)
*G09G 3/30* (2006.01)

(52) U.S. Cl.
CPC ............. *G09G 3/2003* (2013.01); *G09G 3/30* (2013.01); *G09G 2320/0242* (2013.01); *G09G 2320/041* (2013.01); *G09G 2320/0666* (2013.01)

(58) Field of Classification Search
CPC .................................................... G09G 3/2003
See application file for complete search history.

(56) References Cited

U.S. PATENT DOCUMENTS

| | | | | |
|---|---|---|---|---|
| 7,161,566 B2 * | 1/2007 | Cok | G09G 3/3208 345/82 |
| 9,294,748 B2 * | 3/2016 | Mori | H04N 9/68 |
| 10,437,546 B2 * | 10/2019 | Jun | G06F 3/1446 |
| 10,475,395 B2 * | 11/2019 | Zha | G09G 3/342 |

(Continued)

FOREIGN PATENT DOCUMENTS

| | | |
|---|---|---|
| CN | 209299558 U | 8/2019 |
| CN | 112614455 A | 4/2021 |
| CN | 114724505 A | 7/2022 |

OTHER PUBLICATIONS

Shin-Ru Lin, U.S. Appl. No. 18/463,490, filed Sep. 8, 2023, "Luminance Compensation Method and Display System".

*Primary Examiner* — Chun-Nan Lin
(74) *Attorney, Agent, or Firm* — WPAT, P.C

(57) ABSTRACT

A brightness compensation device includes a panel, a heat detector, a memory, and a processor. he processor is configured to perform the following steps: at a specific grayscale of the red grayscale data, the green grayscale data, or the blue grayscale data, adjusting a turn-on time data of a luminous signal according to the first temperature data; adjusting the red grayscale data, the green grayscale data, or the blue grayscale data according to a brightness relation or the sheet to obtain a red updating grayscale data, a green updating grayscale data, or a blue updating grayscale data; and when it is determined that the second temperature data is the same as the first temperature data, outputting or storing the red updating grayscale data, the green updating grayscale data, or the blue updating grayscale data.

20 Claims, 14 Drawing Sheets

100

(56) References Cited

U.S. PATENT DOCUMENTS

| | | | | |
|---|---|---|---|---|
| 2008/0224966 | A1* | 9/2008 | Cok | H05B 45/20 345/82 |
| 2009/0212716 | A1* | 8/2009 | Chen | H05B 45/395 315/294 |
| 2012/0075358 | A1* | 3/2012 | Shirai | H04N 9/73 345/82 |
| 2014/0104297 | A1* | 4/2014 | Yang | G09G 3/2003 345/589 |
| 2014/0105127 | A1* | 4/2014 | Zhuang | H04L 1/1671 370/328 |
| 2014/0285533 | A1* | 9/2014 | Chun | G09G 3/3208 345/83 |
| 2017/0076673 | A1* | 3/2017 | Shintani | G06F 3/14 |
| 2017/0206848 | A1* | 7/2017 | Jeon | G09G 3/2007 |
| 2020/0219432 | A1* | 7/2020 | Park | G09G 3/2003 |
| 2021/0225262 | A1 | 7/2021 | Liu | |
| 2021/0295767 | A1* | 9/2021 | Seo | G09G 3/2003 |
| 2023/0126636 | A1* | 4/2023 | Jeong | G09G 3/2092 345/55 |
| 2023/0386385 | A1* | 11/2023 | Pyun | G09G 3/2096 |
| 2024/0105127 | A1* | 3/2024 | Park | G09G 3/2007 |
| 2024/0135851 | A1* | 4/2024 | Kim | G09G 3/2003 |
| 2024/0203307 | A1* | 6/2024 | Sung | G09G 3/006 |

* cited by examiner

900

BRIGHTNESS COMPENSATION DEVICE AND BRIGHTNESS COMPENSATION METHOD

CROSS-REFERENCE TO RELATED APPLICATION

This application claims priority to Taiwan Application Serial Number 112111290, filed Mar. 24, 2023, which is herein incorporated by reference in its entirety.

BACKGROUND

Field of Invention

The present invention relates to a compensation device and a compensation method. More particularly, the present invention relates to a brightness compensation device and a brightness compensation method.

Description of Related Art

At present, micro light emitting diodes (Micro LEDs) are used for the panel to display an image. The panel made of the micro light emitting diodes can be used in general panels, automotive panels, or various occasions.

However, as a room temperature or a panel temperature increases, users will find that the brightness and chromaticity of the above panel will gradually deviate from the standard setting values (that is, a color of the screen of the above panel has a color shift). When the above panel is used in a high temperature situation or when a use time increases, it is easy to cause the above panel to darken or lose color.

SUMMARY

The present disclosure provides a brightness compensation device. The brightness compensation device comprises a panel, a heat detector, a memory, and a processor. The panel comprises a plurality of light emitting diodes (LEDs). The heat detector is configured to receive a first temperature data and a second temperature data. The memory is configured to store a plurality of commands and a sheet. The processor is coupled to the panel, the heat detector, and the memory, and the processor is configured to perform the following steps according to the plurality of commands of the memory: receiving the first temperature data; receiving a red grayscale data, a green grayscale data, and a blue grayscale data of the panel; at a specific grayscale of the red grayscale data, the green grayscale data, or the blue grayscale data, adjusting a turn-on time data of a luminous signal according to the first temperature data; adjusting the red grayscale data, the green grayscale data, or the blue grayscale data according to a brightness relation or the sheet to obtain a red updating grayscale data, a green updating grayscale data, or a blue updating grayscale data; receiving and determining whether the second temperature data is the same as the first temperature data; and when it is determined that the second temperature data is the same as the first temperature data, outputting or storing the red updating grayscale data, the green updating grayscale data, or the blue updating grayscale data.

The present disclosure provides a brightness compensation method. The brightness compensation method comprises following steps: receiving a first temperature data; receiving a red grayscale data, a green grayscale data, and a blue grayscale data of a panel; at a specific grayscale of the red grayscale data, the green grayscale data, or the blue grayscale data, adjusting a turn-on time data of a luminous signal according to the first temperature data; adjusting the red grayscale data, the green grayscale data, or the blue grayscale data according to a brightness relation or a sheet to obtain a red updating grayscale data, a green updating grayscale data, or a blue updating grayscale data; receiving and determining whether a second temperature data is the same as the first temperature data; and when it is determined that the second temperature data is the same as the first temperature data, outputting or storing the red updating grayscale data, the green updating grayscale data, or the blue updating grayscale data.

Therefore, based on the technical content of the present disclosure, the brightness compensation device and the brightness compensation method shown in the embodiment of the present disclosure can adjust the brightness and chromaticity of the panel through the brightness relation or the sheet, so that the brightness and chromaticity of the panel still meet standard values when the panel is used for a long time or when the ambient temperature rises.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

Figure 1:
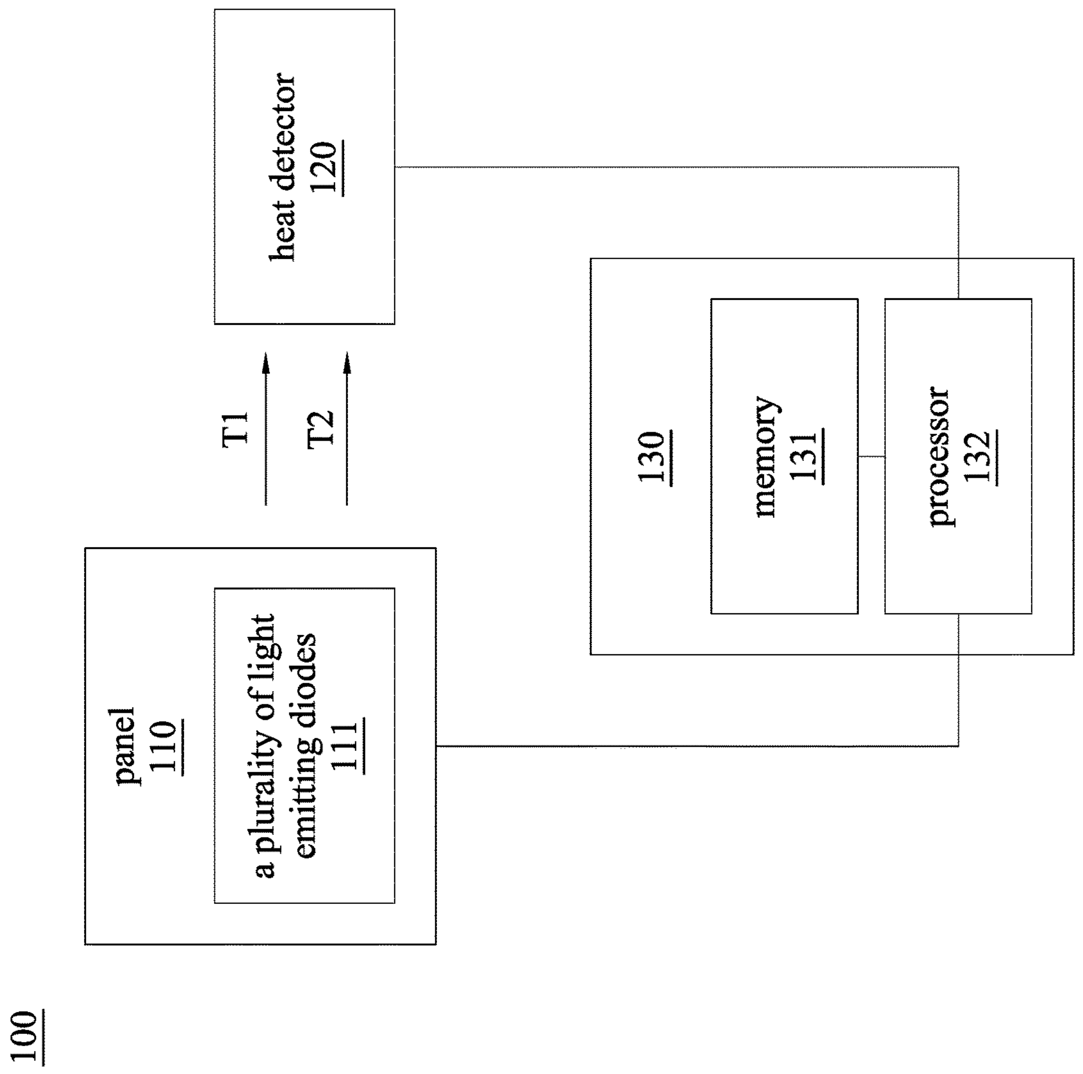
FIG. 1 shows a schematic diagram of a brightness compensation device according to one embodiment of the present disclosure.

In accordance with customary practice, the various features and elements in the drawings are not drawn to scale, but are drawn in a manner that best represents the specific features and elements relevant to the present disclosure. Furthermore, among the different drawings, similar elements/components are referred to by the same or similar reference numerals.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Various embodiments of the present technology are discussed in detail below with figures. It should be understood that the details should not limit the present disclosure. In other words, in some embodiments of the present disclosure, the details are not necessary. In addition, for simplification of figures, some known and commonly used structures and elements are illustrated simply in figures.

In the present disclosure, "connected" or "coupled" may refer to "electrically connected" or "electrically coupled." "Connected" or "coupled" may also refer to operations or actions between two or more elements.

FIG. 1 shows a schematic diagram of a brightness compensation device according to one embodiment of the present disclosure. As shown in FIG. 1, the brightness compensation device 100 includes a panel 110, a heat detector 120, and host 130. The host 130 includes a memory 131 and a processor 132. In connection relationship, the panel 110 is coupled to the host 130, and the heat detector 120 is coupled to the host 130. In the host 130, the memory 131 is coupled to the processor 132. In some embodiments, the host 130 can be a display host or a computer host, but the present disclosure is not limited to this embodiment. In some embodiments, the panel 110 and the host 130 can form a screen or a display, but the present disclosure is not limited to this embodiment.

In order to adjust the brightness and chromaticity of the panel through the brightness relation or the sheet, so that the brightness and chromaticity of the panel still meet standard values when the panel is used for a long time or when the ambient temperature rises. The present disclosure provides a detailed description of an operation of the brightness compensation device 100 shown in FIG. 1 as below.

In one embodiment, the panel 110 includes a plurality of light emitting diodes 111. For example, the plurality of light emitting diodes 111 can be any type of light-emitting diodes, such as micro light emitting diodes (Micro LEDs), mini light emitting diodes (Mini LEDs), or organic light emitting diodes (Organic LED, OLED), but the present disclosure is not limited to this embodiment. In some embodiments, the panel 110 can or can not have liquid crystal layer, but the present disclosure is not limited to this embodiment. In some embodiments, panel 110 can be an automotive panel (or automotive display), but the present disclosure is not limited to this embodiment. Besides, the present disclosure is for convenience of explanation, so the plurality of light emitting diodes 111 in FIG. 1 are shown as a block schematic diagram.

In this embodiment, the heat detector 120 is used to receive a first temperature data T1 and a second temperature data T2. For example, the first temperature data T1 can be a temperature of the panel 110 or an ambient temperature, the second temperature data T2 can be the temperature of the panel 110 or the ambient temperature, but the present disclosure is not limited to this embodiment. In some embodiments, the heat detector 120 can be any detector used to receive or obtain the first temperature data T1 and the second temperature data T2, such as an infrared detector, or thermal sensor, but the present disclosure is not limited to this embodiment. In some embodiments, an unit of the first temperature data T1 and the second temperature data T2 can be Celsius (° C.), but the present disclosure is not limited to this embodiment.

In this embodiment, the memory 131 is used to store a plurality of commands and a sheet. For example, the memory 131 can be a storage hardware (such as a hard disk drive (HDD) or a solid-state drive (SSD)), the plurality of commands can be software coding (code) or operation commands, and the sheet can be various lookup tables or shipping specification tables related to the photoelectric signals output by the panel 110, but the present disclosure is not limited to this embodiment.

In this embodiment, the processor 132 is coupled to the panel 110, the heat detector 120, and the memory 131, and the processor 132 is used to perform the following steps according to a plurality of commands of the memory 131: receiving the first temperature data T1; receiving a red grayscale data, a green grayscale data, and a blue grayscale data of the panel 110; at a specific grayscale of the red grayscale data, the green grayscale data, or the blue grayscale data, adjusting a turn-on time data of a luminous signal according to the first temperature data T1; adjusting the red grayscale data, the green grayscale data, or the blue grayscale data according to a brightness relation or the sheet to obtain a red updating grayscale data, a green updating grayscale data, or a blue updating grayscale data; receiving and determining whether the second temperature data T2 is the same as the first temperature data T1; and when it is determined that the second temperature data T2 is the same as the first temperature data T1, outputting or storing the red updating grayscale data, the green updating grayscale data, or the blue updating grayscale data. In some embodiments, the processor 132 can be a central processing unit (CPU) or a timing controller (TCON), but the present disclosure is not limited to this embodiment.

Figure 2:
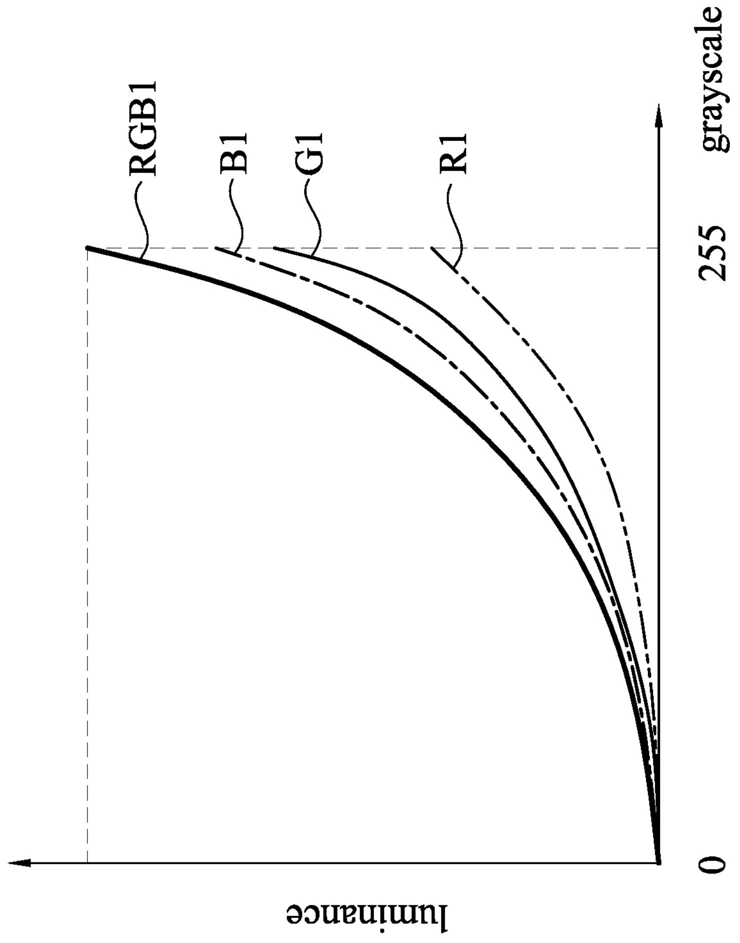
FIG. 2 shows a data diagram of a brightness compensation device according to one embodiment of the present disclosure.
Figure 3B:
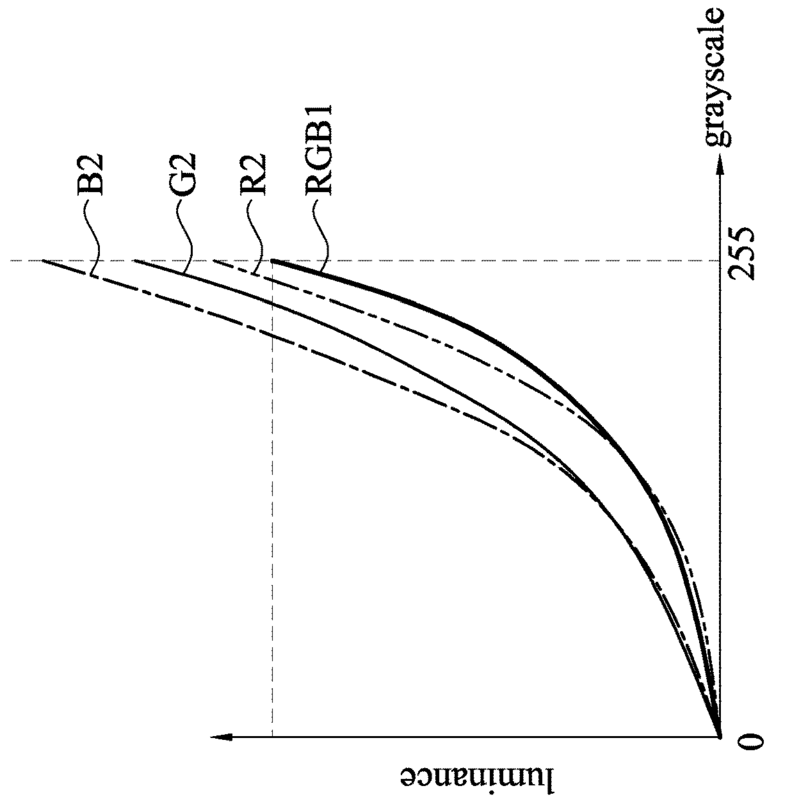
FIG. 3A to FIG. 3B show data diagrams of a brightness compensation device according to one embodiment of the present disclosure.
Figure 3A:
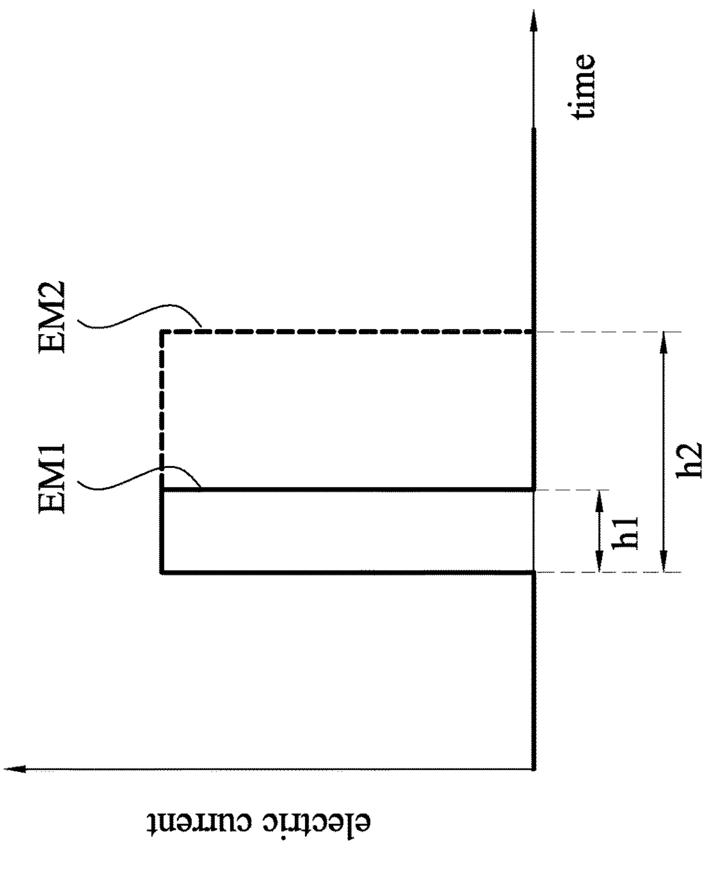
Figure 4:
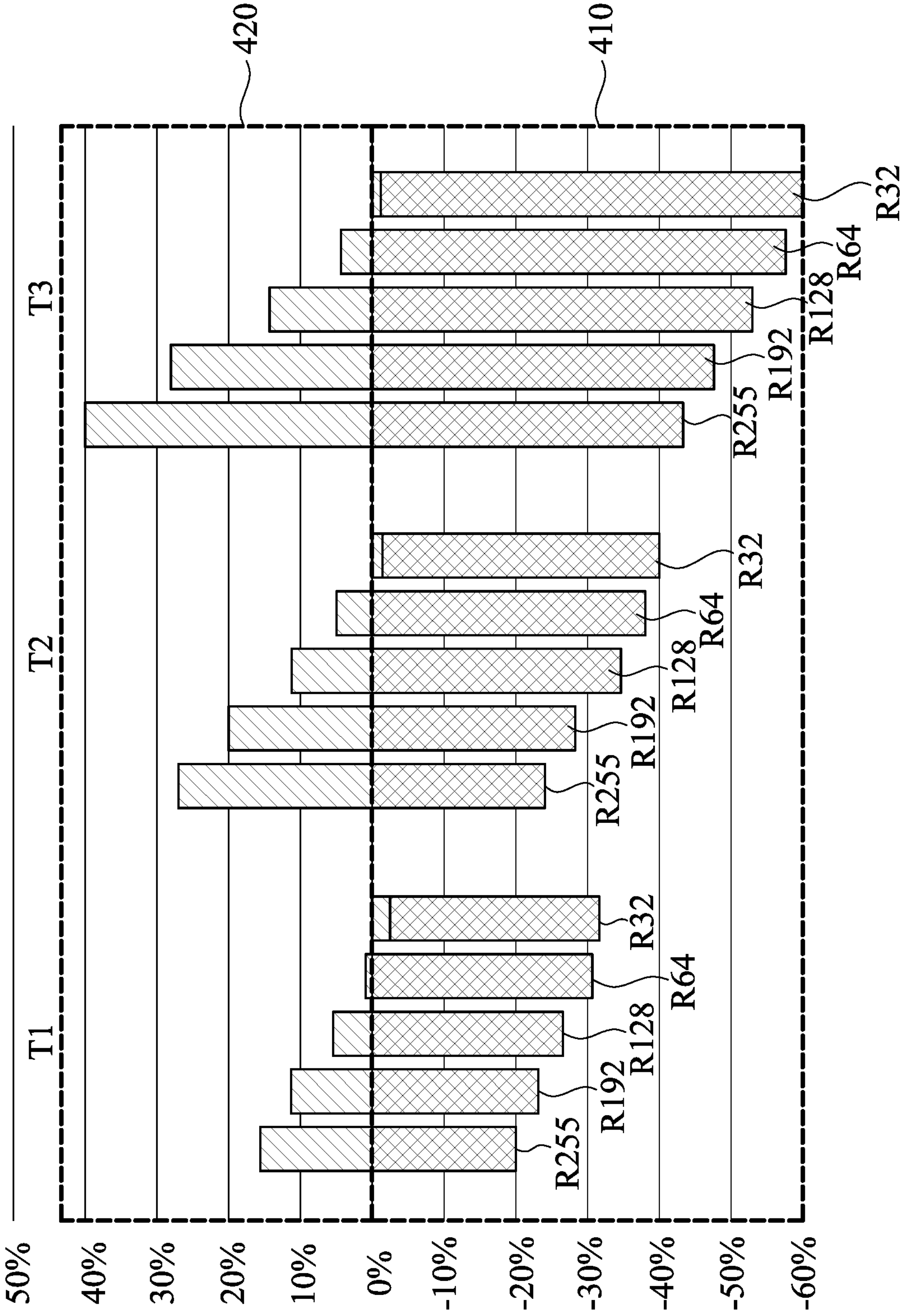
FIG. 4 shows a data diagram of a brightness compensation device according to one embodiment of the present disclosure.
Figure 5:
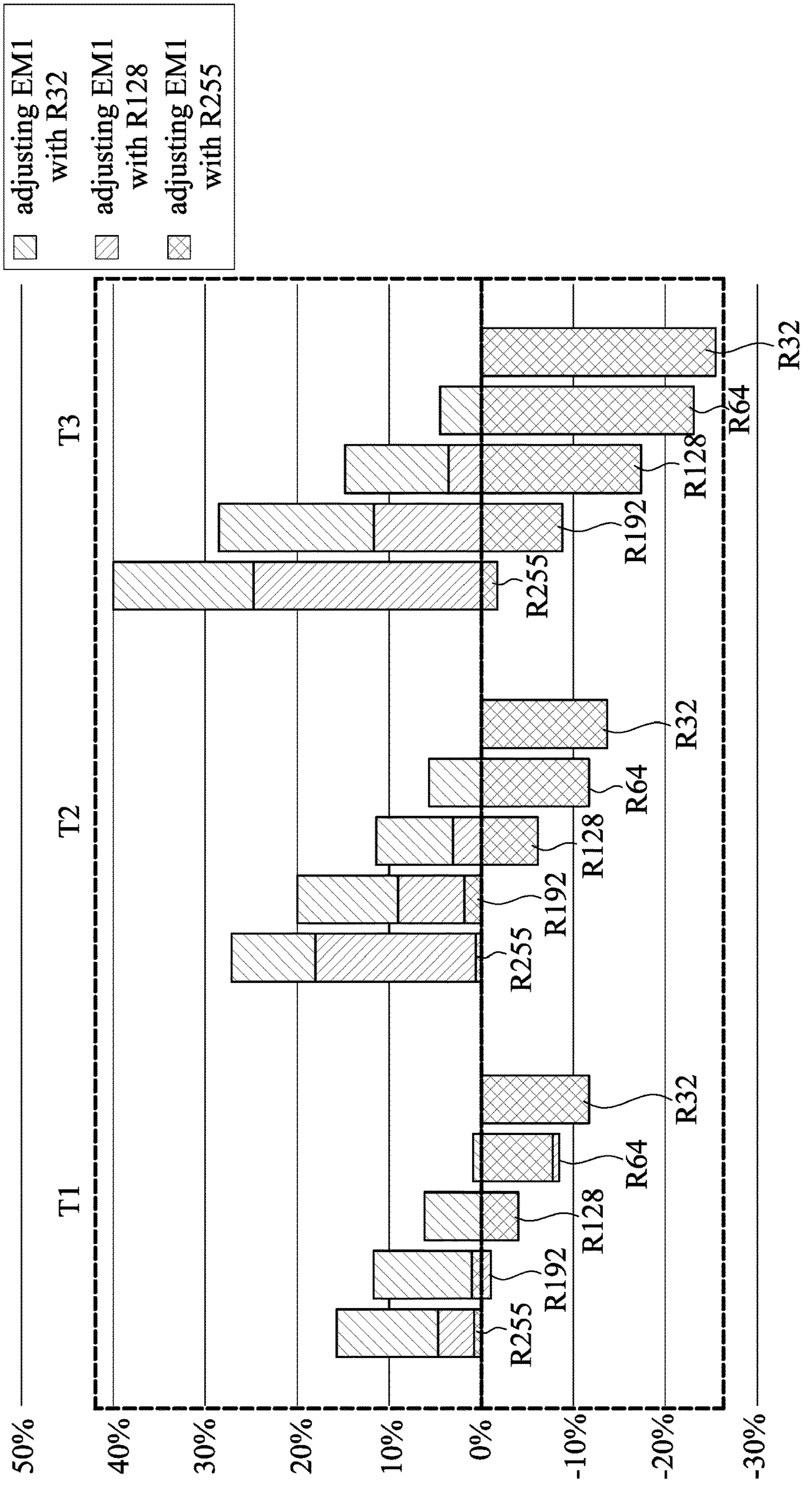
FIG. 5 shows a data diagram of a brightness compensation device according to one embodiment of the present disclosure.
Figure 6:
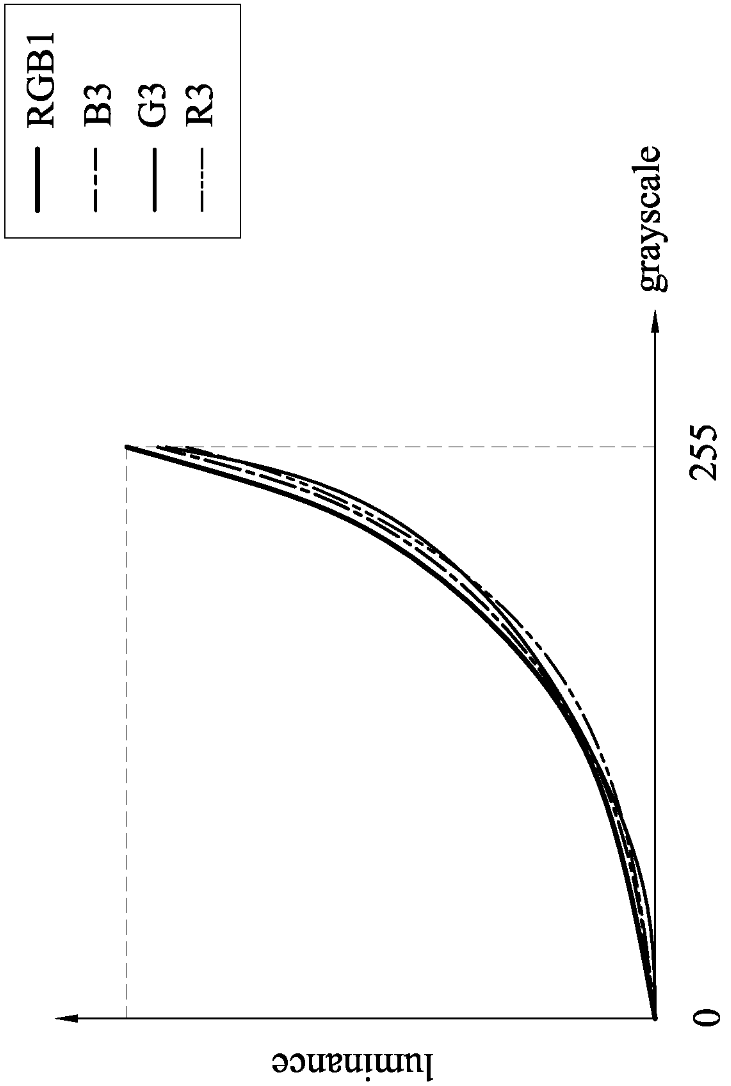
FIG. 6 shows a data diagram of a brightness compensation device according to one embodiment of the present disclosure.
Figure 7:
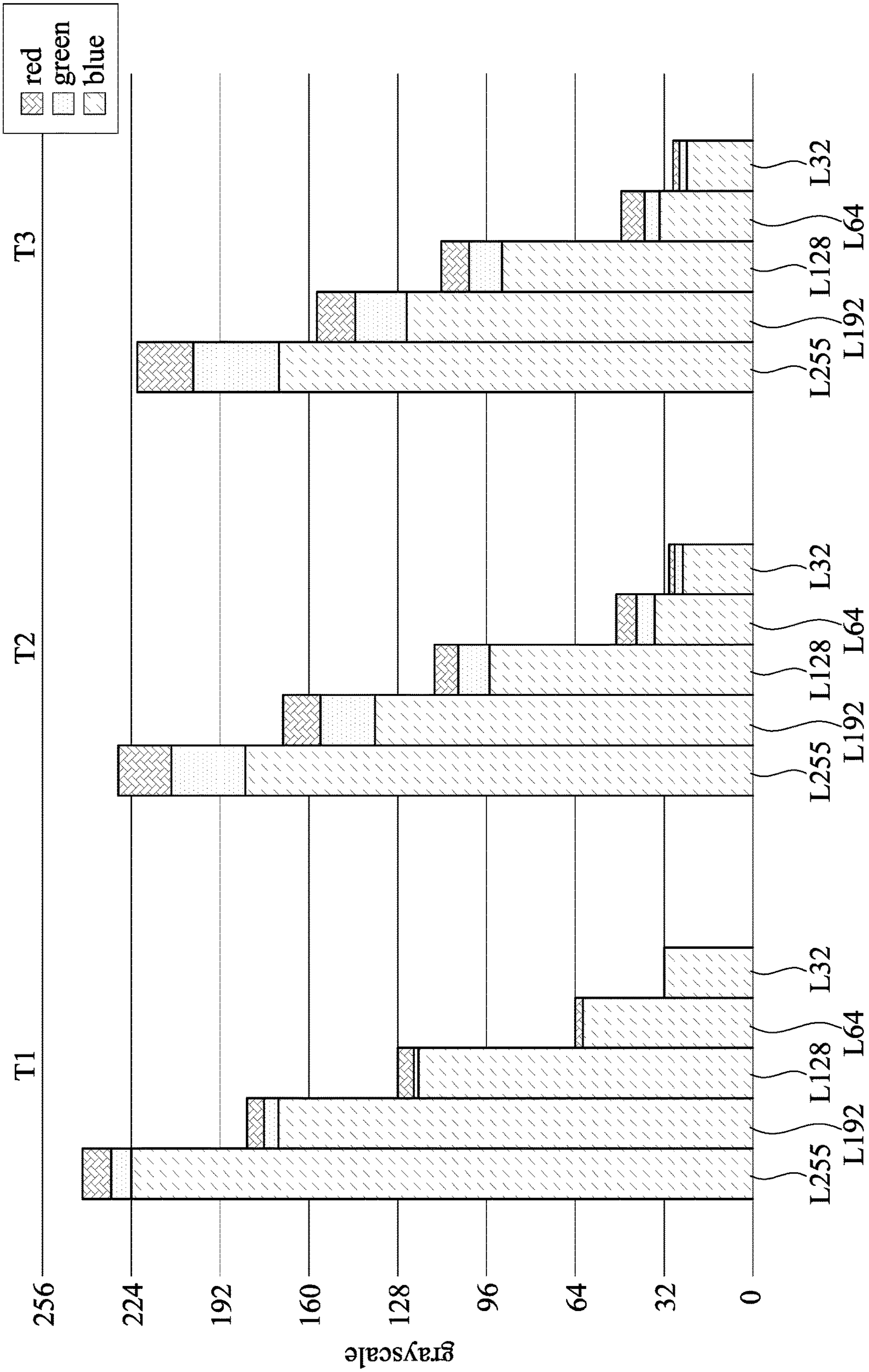
FIG. 7 shows a data diagram of a brightness compensation device according to one embodiment of the present disclosure.
Figures 8A, 8B:
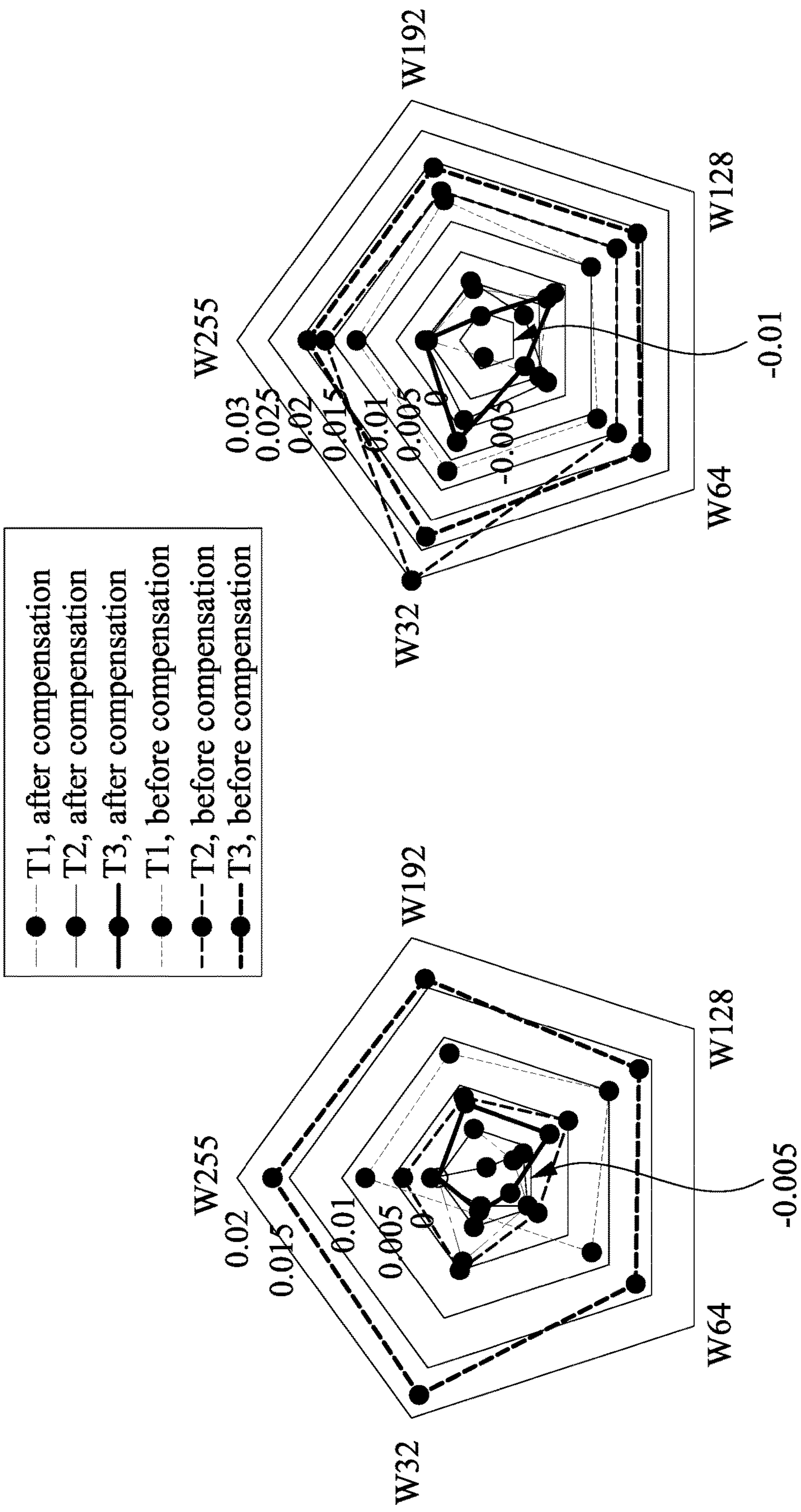
FIG. 8A to FIG. 8B show data diagrams of a brightness compensation device according to one embodiment of the present disclosure.

In order to make the above-mentioned operation of the brightness compensation device 100 easy to understand, please refer to FIG. 2 to FIG. 8B. FIG. 2 shows a data diagram of a brightness compensation device according to one embodiment of the present disclosure. FIG. 3A to FIG. 3B show data diagrams of a brightness compensation device according to one embodiment of the present disclosure. FIG. 4 shows a data diagram of a brightness compensation device according to one embodiment of the present disclosure. FIG. 5 shows a data diagram of a brightness compensation device according to one embodiment of the present disclosure. FIG. 6 shows a data diagram of a brightness compensation device according to one embodiment of the present disclosure. FIG. 7 shows a data diagram of a brightness compensation device according to one embodiment of the present disclosure. FIG. 8A to FIG. 8B show data diagrams of a brightness compensation device according to one embodiment of the present disclosure.

Please refer to FIG. 1 to FIG. 8B, in one embodiment, in operations, the processor 132 is used to perform the following steps according to the plurality of commands of the memory 131: receiving the first temperature data T1; receiving the red grayscale data R1, the green grayscale data G1, and the blue grayscale data B1 of the panel 110 (as shown in FIG. 2). For example, the first temperature data T1 can be the temperature of the panel 110, a panel 110 temperature of the plurality of light emitting diodes 111, or an ambient temperature of an environment where panel 110 is used. The red grayscale data R1, the green grayscale data G1, and the blue grayscale data B1 can be the red, green, and blue grayscales (0 to 255 grayscales) versus the brightness data of the panel 110 measured at a temperature of 60 degrees. A grayscale data RGB1 can be a target brightness data corresponding to the red, green, and blue grayscales (0 to 255 grayscales) of the panel 110 at each temperature (such as the target brightness or the target gamma value at each temperature)), but the present disclosure is not limited to this embodiment. In some embodiments, the grayscale data RGB1 can be the target brightness data corresponding to the red, green, and blue grayscales (0 to 255 grayscales) of the panel 110 under an initial setting temperature (such as the temperature is 25 degrees), but the present disclosure is not limited to this embodiment.

In some embodiments, the brightness compensation device 100 can have a light detector, and the light detector can be used to obtain the red grayscale data R1, the green grayscale data G1, and the blue grayscale data B1. For example, the light detector can be any kind of photosensitive element, such as a Charge Coupled Device (CCD), a CMOS Image Sensor (CIS), a video camera, or a camera, but the present disclosure is not limited to this embodiment.

In some embodiments, the plurality of light emitting diodes 111 can be red micro light emitting diodes, green micro light emitting diodes, and blue micro light emitting diodes. When the temperature of the panel 110 or the ambient temperature increases, a brightness drop amplitude of the red micro light emitting diodes can be greater than a brightness drop amplitude of the green micro light emitting diodes or a brightness drop amplitude of the blue micro light emitting diodes, and the brightness drop amplitude of the green micro light emitting diodes can be greater than the brightness drop amplitude of the blue micro light emitting diodes, but the present disclosure is not limited to this embodiment.

Then, the processor 132 perform the following steps according to the plurality of commands of the memory 131: at the specific grayscale of the red grayscale data R1, the green grayscale data G1, or the blue grayscale data B1, adjusting the turn-on time data h1 of the luminous signal EM1 (as shown in FIG. 3A) according to the first temperature data T1. For example, the specific grayscale can be 32 level of grayscale of the red grayscale data R1, the processor 132 can adjust the turn-on time data h1 (such as 1h) to a turn-on time data h2 (such as 6h), but the present disclosure is not limited to this embodiment. In some embodiments, an electric current unit of the luminous signal EM1 can be a micro-ampere (μA), and a time unit of the turn-on time data h1 can be a micro-second (μs). The turn-on time data h1 can be a turn-on time of the luminous signal EM1 at a temperature of 25 degrees, and the turn-on time data h2 can be a turn-on time of the luminous signal EM1 (or a luminous signal EM2) at a temperature of 60 degrees, but the present disclosure is not limited to this embodiment.

Besides, FIG. 3 is a result of adjusting FIG. 2 from the turn-on time data h1 to the turn-on time data h2. As can be seen from FIG. 3B, a red grayscale data R2, a green grayscale data G2, and a blue grayscale data B2 can be greater than or equal to the grayscale data RGB1, but the present disclosure is not limited to this embodiment. In some embodiments, the red grayscale data R2, the green grayscale data G2, and the blue grayscale data B2 can be data measured (or obtained) at a temperature of 60 degrees, but the present disclosure is not limited to this embodiment.

Furthermore, a logic of adjusting the turn-on time data h1 to the turn-on time data h2 can be to first determine the turn-on time (or width) of the luminous signal EM1 to be adjusted according to a current ambient temperature (or a panel temperature) to compensate for the brightness. The specific grayscale R32 brightness of the red grayscale data R1 with a temperature of 25 degrees (° C.) is used as a compensation target. For details, please refer to FIG. 4.

In some embodiments, please refer to FIG. 4 together, a chart 410 can be the brightness drop amplitude of the specific grayscales R32 to R255 of the red grayscale data R1 at temperatures T1 to T3 (corresponding to the turn-on time data h1), and a chart 420 can be the brightness compensation amplitude of the specific grayscales R32 to R255 of the red grayscale data R1 at temperatures T1 to T3 (corresponding to the turn-on time data h2), but the present disclosure is not limited to this embodiment. Besides, a temperature T1 can be 40 degrees, a temperature T2 can be 50 degrees, a temperature T3 can be 60 degrees, and specific grayscale R32 to R255 of the red grayscale data R1 can have grayscale numbers of 32, 64, 128, 192 and 255, but the present disclosure is not limited to this embodiment. In some embodiments, as the temperature rises, the lower the grayscale (such as a specific grayscale R32), the greater the amplitude of brightness drop. Therefore, the lower the red grayscale, the luminous signal EM1 is adjusted to compensate for the target brightness, and the turn-on time required for the luminous signal EM1 is also longer. When the temperature is higher, the turn-on time required for the luminous signal EM1 is also longer, as detailed below.

When $GL_{EMx}<GL_{EMy}, EM_x>EM_y$ relation 1.

As mentioned above, in the relation 1, when a temperature is 40 degrees, $GL_{EMx}$ can be 32 (that is, the specific grayscale R32 of the red grayscale data R1), $GL_{EMy}$ can be 128 (that is, the specific grayscale R128 of the red grayscale data R1), $EM_x$ of the specific grayscale R32 can be 20h (h is a scan line turn-on time), and $EM_y$ of the specific grayscale R128 can be 18h, but the present disclosure is not limited to this embodiment. In some embodiments, $GL_{EMx}$ and $GL_{EMy}$ can be a target grayscale of the red grayscale data R1 compensated by adjusting the luminous signal EM1, but the present disclosure is not limited to this embodiment.

When $Temp_A>Temp_B, EM_A>EM_B$ relation 2.

As mentioned above, in the relation 2, in the red grayscale data R2, $Temp_A$ can be 60 degrees (° C.), $Temp_B$ can be 40 degrees, $EM_A$ at 60 degrees can be 34h (h is the scan line turn-on time), and $EM_B$ at 40 degrees can be 20h, but the present disclosure is not limited to this embodiment.

In some embodiments, please refer to FIG. 5, it can be seen from FIG. 5 that when the luminous signal EM1 is adjusted for a certain grayscale (that is, the specific grayscale) of the red grayscale data R1 to compensate the brightness to the target brightness, the brightness of red grayscale data R1 higher than this specific grayscale will be greater than its target value. The brightness of red grayscale data R1 below this specific grayscale will be smaller than its target value, as detailed below.

$$\text{When } GL_x > GL_{EM}, Lum_{Rx} > Lum_{Rx\_STD} \quad \text{relation 3.}$$

As mentioned above, un the relation 3, $GL_x$ can be 128 (that is, the specific grayscale R128 of the red grayscale data R1), $GL_{EM}$ can be 32 (that is, the specific grayscale R32 of the red grayscale data R1), $Lum_{Rx}$ of the specific grayscale R128 can be 53 nits, and a grayscale target brightness $Lum_{RX\_STD}$ of the specific grayscale R128 can be 50 nits, but the present disclosure is not limited to this embodiment.

$$\text{When } GL_y < GL_{EM}, Lum_{Ry} < Lum_{Ry\_STD} \quad \text{relation 4.}$$

As mentioned above, in the relation 4, $GL_y$ can be 16 (that is, the specific grayscale of the red grayscale data R1 is 16 grayscale), $GL_{EM}$ can be 32 (that is, the specific grayscale R32 of the red grayscale data R1), $Lum_{Ry}$ in the specific grayscale is 16 grayscale can be 0.289 nits, and the grayscale target brightness $Lum_{Ry\_STD}$ in the specific grayscale us 16 grayscale can be 0.3 nits, but the present disclosure is not limited to this embodiment. In some embodiments, please refer to FIG. 2 and FIG. 3B together, the brightness of the green grayscale data G1 or the blue grayscale data B1 drops with temperature less than the brightness of the red grayscale data R1 drops with temperature. Therefore, after the luminous signal EM1 is adjusted at this time, the brightness of each grayscale of the green grayscale data G2 or the blue grayscale data B2 will be greater than the target brightness in a temperature of 25 degrees (that is, the grayscale data RGB1), but the present disclosure is not limited to this embodiment.

Afterwards, the processor 132 performs the following steps according to the plurality of commands of the memory 131: adjusting the red grayscale data R2 (as shown in FIG. 3B), the green grayscale data G2, or the blue grayscale data B2 according to the brightness relation or the sheet to obtain the red updating grayscale data R3 (as shown in FIG. 6), the green updating grayscale data G3, or the blue updating grayscale data B3. For example, the brightness relation can be any relevant formula or relation that adjust the red grayscale data R2, the green grayscale data G2, or the blue grayscale data B2 to the red updating grayscale data R3, the green updating grayscale data G3, or the blue updating grayscale data B3, and the sheet can be any lookup table or shipping specification table that adjust the red grayscale data R2, the green grayscale data G2, or the blue grayscale data B2 to the red updating grayscale data R3, the green updating grayscale data G3, or the blue updating grayscale data B3, but the present disclosure is not limited to this embodiment.

In some embodiments, please refer to FIG. 7 together, after the luminous signal EM1 is adjusted, if the brightness is greater than the target value (that is, the grayscale data RGB1), the grayscale (or the current) needs to be adjusted down. On the other hand, if the brightness is less than the target value, the grayscale (or the current) is increased, and a respective brightness of the red grayscale data R2, the green grayscale data G2, or the blue grayscale data B2 is adjusted to be consistent with the target brightness (that is, the grayscale data RGB1) in a temperature of 25° C. A final result is the red updating grayscale data R3, the green updating grayscale data G3, or the blue updating grayscale data B3, but the present disclosure is not limited to this embodiment. Besides, when a grayscale of the red grayscale data R2 is larger than the target grayscale adjusted by the luminous signal EM1 (such as the specific grayscale R32 of the red grayscale data R1), the more grayscales (or the currents) need to be reduced. When a grayscale of the red grayscale data R2 is smaller than the target grayscale adjusted by the luminous signal EM1, the more grayscales (or the currents) need to be increased, as detailed below.

$$\text{When } GL_x > GL_y > GL_{EM} > GL_r > GL_s, -\Delta GL_x < -\Delta GL_y < \Delta GL_r < \Delta GL_s \quad \text{relation 5.}$$

As mentioned above, in the relation 5 (compared with a standard value of a temperature is 25 degrees), when a temperature is 40 degrees, $GL_x$ can be 128 grayscale, $GL_y$ can be 64 grayscale, $GL_{EM}$ can be 32 grayscale, $GL_r$ can be 16 grayscale, $GL_s$ can be 8 grayscale, $-\Delta GL_x$ can be −7 grayscale, $-\Delta GL_y$ can be −2 grayscale, $\Delta GL_r$ can be 1 grayscale, and $\Delta GL_s$ can be 2 grayscale, but the present disclosure is not limited to this embodiment.

In some embodiments, each grayscale (current) of the green grayscale data G2 and blue grayscale data B2 is reduced to the green updating grayscale data G3 and the blue updating grayscale data B3. When the luminous signal EM1 or EM2 is turned on for a longer time, the drop amplitude becomes larger. The drop amplitude of the blue grayscale data B2 is greater than the drop amplitude of the green grayscale data G2, as detailed below.

$$\text{When } EM_p > EM_t, -\Delta GL_{p\_B} < -\Delta GL_{p\_G} < -\Delta GL_{t\_B} < -\Delta GL_{t\_G} \quad \text{relation 6.}$$

As mentioned above, in the relation 6, when a temperature is 40 degrees, $EM_p$ can be 20h, $EM_t$ can be 16h, $-\Delta GL_{p\_B}$ can be −18 grayscale, $-\Delta GL_{p\_G}$ can be −16 grayscale, $-\Delta GL_{t\_B}$ can be −12 grayscale, $-\Delta GL_{t\_G}$ can be −9 grayscale, and the specific grayscale GL at this time is 128 grayscale, but the present disclosure is not limited to this embodiment.

In some embodiments, a strip (red) in FIG. 7 can be the corresponding red grayscale value under each specific grayscale (such as the specific grayscale L32) at different temperatures (such as the temperature T1 to T3). A strip (green) in FIG. 7 can be the corresponding green grayscale value under each specific grayscale at different temperatures. A strip (blue) in FIG. 7 can be the corresponding blue grayscale value under each specific grayscale at different temperatures, but the present disclosure is not limited to this embodiment.

In some embodiments, please refer to FIG. 8A and FIG. 8B together, after updating (or compensating), a brightness and chromaticity of a white point (or a white image) at each temperature (a temperature T1 can be 40 degrees, a temperature T2 can be 50 degrees, and a temperature T3 can be 60 degrees) are consistent with the target value (at a temperature of 25 degrees). FIG. 8A can be a comparison chart of the color point difference Δx of each grayscale of the white image before and after compensation. FIG. 8B can be a comparison chart of the color point difference Δy of each grayscale of the white image before and after compensation. In some embodiments, the nodes W32, W64, W128, W192, and W255 in FIG. 8A and FIG. 8B can correspond to 32, 64, 128, 192, and 255 grayscales, but the present disclosure is not limited to this embodiment.

Then, the processor 132 performs the following steps according to the plurality of commands of the memory 131: receiving and determining whether the second temperature data T2 is the same as the first temperature data T1; and when it is determined that the second temperature data T2 is the same as the first temperature data T1, outputting or storing the red updating grayscale data R3, the green updating grayscale data G3, or the blue updating grayscale data B3. For example, the first temperature data T1 can be 40 degrees, the second temperature data T2 can be 40 degrees or 50 degrees, and the processor 132 can store the red updating grayscale data R3, the green updating grayscale data G3, or the blue updating grayscale data B3 in the memory 131, but the present disclosure is not limited to this embodiment.

In one embodiment, the first temperature data T1 includes at least one of a panel temperature data and an environment temperature data, and the red updating grayscale data R3, the green updating grayscale data G3, or the blue updating grayscale data B3 is related to a gamma (such as gamma 2.2) curve data. For example, the first temperature data T1 can be the temperature of the panel 110 or the ambient temperature, the red updating grayscale data R3 can fit a gamma curve (such as a gamma 2.2 curve), the green updating grayscale data G3 can fit the gamma curve, the blue updating grayscale data B3 can fit the gamma curve, and the above gamma curve can be a curve corresponding to the target brightness at each grayscale (such as 0 to 255 grayscale) at a temperature is 25 degrees, but the present disclosure is not limited to this embodiment. In some embodiments, the gamma curve (such as the gamma 2.2 curve) can be the grayscale data RGB1, but the present disclosure is not limited to this embodiment.

In one embodiment, the processor 132 is further used to perform the following steps according to the plurality of commands of the memory 131: selecting the specific grayscale R32 of the red grayscale data R1 according to a power limit of the panel 110. For example, the power limit can be 200 W, but the present disclosure is not limited to this embodiment.

In this embodiment, the processor 132 is further used to perform the following steps according to the plurality of commands of the memory 131: at the first temperature data T1, the specific grayscale R32 of the red grayscale data R1 is compensated to a target brightness (such as the grayscale data RGB1) corresponding to the red grayscale data R1 according to a first turn-on time h1; at a second temperature data T2, the specific grayscale R32 of the red grayscale data R1 is compensated to the target brightness (such as the grayscale data RGB1) corresponding to the red grayscale data according to a second turn-on time h2. For example, the first temperature data T1 can be 30 degrees, the second temperature data T2 can be 50 degrees, the first turn-on time h1 can be 20 h, and the second turn-on time h2 can be 24 h, but the present disclosure is not limited to this embodiment. In some embodiments, the red grayscale data R1 corresponding to the first temperature data T1 and the red grayscale data R1 corresponding to the second temperature data T2 are different grayscale data, but the present disclosure is not limited to this embodiment.

In this embodiment, the processor 132 is further used to perform the following steps according to the plurality of commands of the memory 131: recording the first turn-on time h1 and the second turn-on time h2 in a turn-on schedule (as shown in Table 1 below) of the sheet. For example, the processor 132 can output the first turn-on time h1 and the second turn-on time h2 as the turn-on schedule (or the lookup table), but the present disclosure is not limited to this embodiment.

TABLE 1

| Temperature (° C.) | 30 | 50 | 85 |
|---|---|---|---|
| Turn-on time (h) | 20 | 24 | 50 |

In one embodiment, the processor 132 is further used to perform the following steps according to the plurality of commands of the memory 131: at a first setting of the first temperature data T1 and the first turn-on time h1, adjusting the red grayscale data R2 to a first compensating grayscale data R3; at the first setting, adjusting the green grayscale data G2 to a second compensating grayscale data G3; at the first setting, adjusting the blue grayscale data B2 to a third compensating grayscale data B3. For example, the first setting can be a setting with a temperature is 30 degrees and the turn-on time is 20 h, but the present disclosure is not limited to this embodiment. In some embodiments, the first compensating grayscale data R3, the second compensating grayscale data G3, and the third compensating grayscale data B3 can each be close to the grayscale data RGB1, but the present disclosure is not limited to this embodiment.

In this embodiment, the processor 132 is further used to perform the following steps according to the plurality of commands of the memory 131: recording the first compensating grayscale data R3, the second compensating grayscale data G3, or the third compensating grayscale data B3 in a compensating grayscale sheet of the sheet (as shown in Table 2, Table 3 and Table 4 below). The first compensating grayscale data R3, the second compensating grayscale data G3, and the third compensating grayscale data B3 are related to a gamma curve data (such as the gamma 2.2 curve).

TABLE 2

| Compensating grayscale data (Red) | 30 degrees | 50 degrees | 85 degrees |
|---|---|---|---|
| 0 grayscale | 0 | 0 | 0 |
| 32 grayscale | 33 | 30 | 27 |
| 224 grayscale | 221 | 208 | 195 |
| 255 grayscale | 249 | 237 | 228 |

TABLE 3

| Compensating grayscale data (Green) | 30 degrees | 50 degrees | 85 degrees |
|---|---|---|---|
| 0 grayscale | 0 | 0 | 0 |
| 32 grayscale | 30 | 28 | 26 |
| 224 grayscale | 204 | 182 | 176 |
| 255 grayscale | 233 | 209 | 187 |

TABLE 4

| Compensating grayscale data (Blue) | 30 degrees | 50 degrees | 85 degrees |
|---|---|---|---|
| 0 grayscale | 0 | 0 | 0 |
| 32 grayscale | 30 | 27 | 25 |
| 224 grayscale | 202 | 179 | 163 |
| 255 grayscale | 231 | 208 | 186 |

As mentioned above, Table 2, Table 3, and Table 4 can record a compensating grayscale data after the red, green, and blue grayscale compensation. In some embodiments, the compensating grayscale sheet can be an actual measured value, or it can be further made from a plurality of specific grayscales using an interpolation method, but the present disclosure is not limited to this embodiment.

In one embodiment, the processor 132 is used to perform the following steps according to the plurality of commands of the memory 131: at a second setting of the second temperature data T2 and the second turn-on time h2, adjusting the red grayscale data R2 to a fourth compensating grayscale data R3; at the second setting, adjusting the green grayscale data G2 to a fifth compensating grayscale data G3; at the second setting, adjusting the blue grayscale data B2 to a sixth compensating grayscale data B3 according to an adjustment algorithm; and recording the fourth compensating grayscale data R3, the fifth compensating grayscale data G3, or the sixth compensating grayscale data B3 in the compensating grayscale sheet (as shown in Table 2, Table 3, and Table 4), and the fourth compensating grayscale data R3, the fifth compensating grayscale data G3, the sixth compensating grayscale data B3 are related to the gamma curve data. For example, the second setting can be a setting with a temperature is 50 degrees and a turn-on time is 24 h, but the present disclosure is not limited to this embodiment.

In this embodiment, the processor 132 is further used to perform the following steps according to the plurality of commands of the memory 131: receiving a white grayscale data of the panel 110 and determining whether the white grayscale data is close to a white brightness chromaticity target value; and when it is determined that the white grayscale data is close to the white brightness chromaticity target value, outputting the compensating grayscale sheet (as shown in Table 2, Table 3, and Table 4). For example, the white grayscale data can be a grayscale versus brightness curve measured by the panel 110 under the white image, the white brightness chromaticity target value can be the gamma curve under the white image or a white color point (0.313, 0.329), but the present disclosure is not limited to this embodiment.

In one embodiment, the processor 132 is further used to perform the following steps according to the plurality of commands of the memory 131: at the specific grayscale (such as 32 grayscale) of the red grayscale data R1, the green grayscale data G2, or the blue grayscale data B2, adjusting the turn-on time h1 of the luminous signal EM1 according to the sheet (such as Table 1). For example, the processor 132 can adjust the turn-on time h1 of the luminous signal to 20 h according to Table 1, but the present disclosure is not limited to this embodiment.

In one embodiment, the processor 132 is further used to perform the following steps according to the plurality of commands of the memory 131: setting a plurality of target brightness corresponding to the red grayscale data R1, the green grayscale data G1, or the blue grayscale data B1. For example, the plurality of target brightness corresponding to the red grayscale data R1, the green grayscale data G1, or the blue grayscale data B1 can be the grayscale data RGB1 (as shown in FIG. 2), but the present disclosure is not limited to this embodiment.

Figure 9:
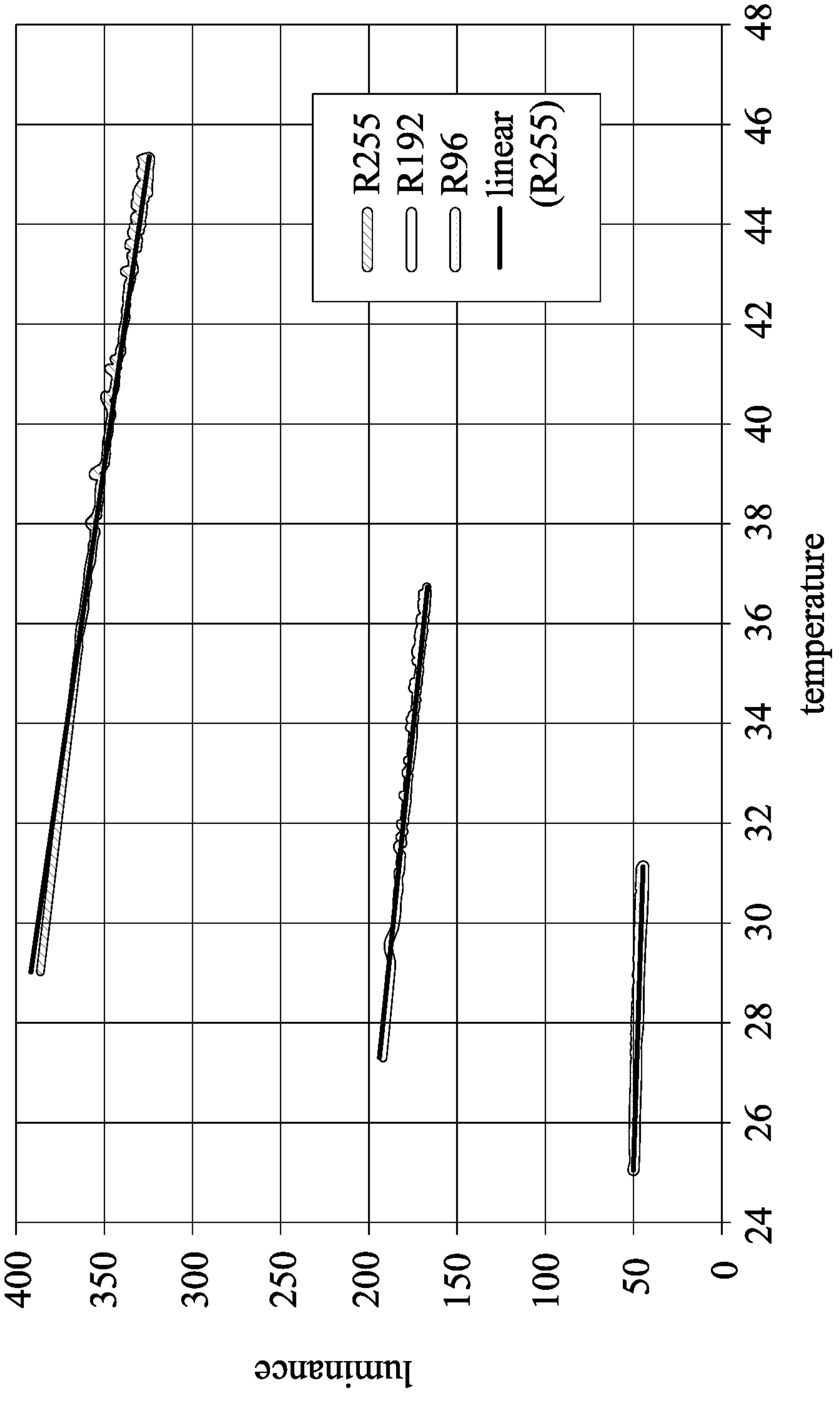
FIG. 9 shows a data diagram of a brightness compensation device according to one embodiment of the present disclosure.
Figure 10:
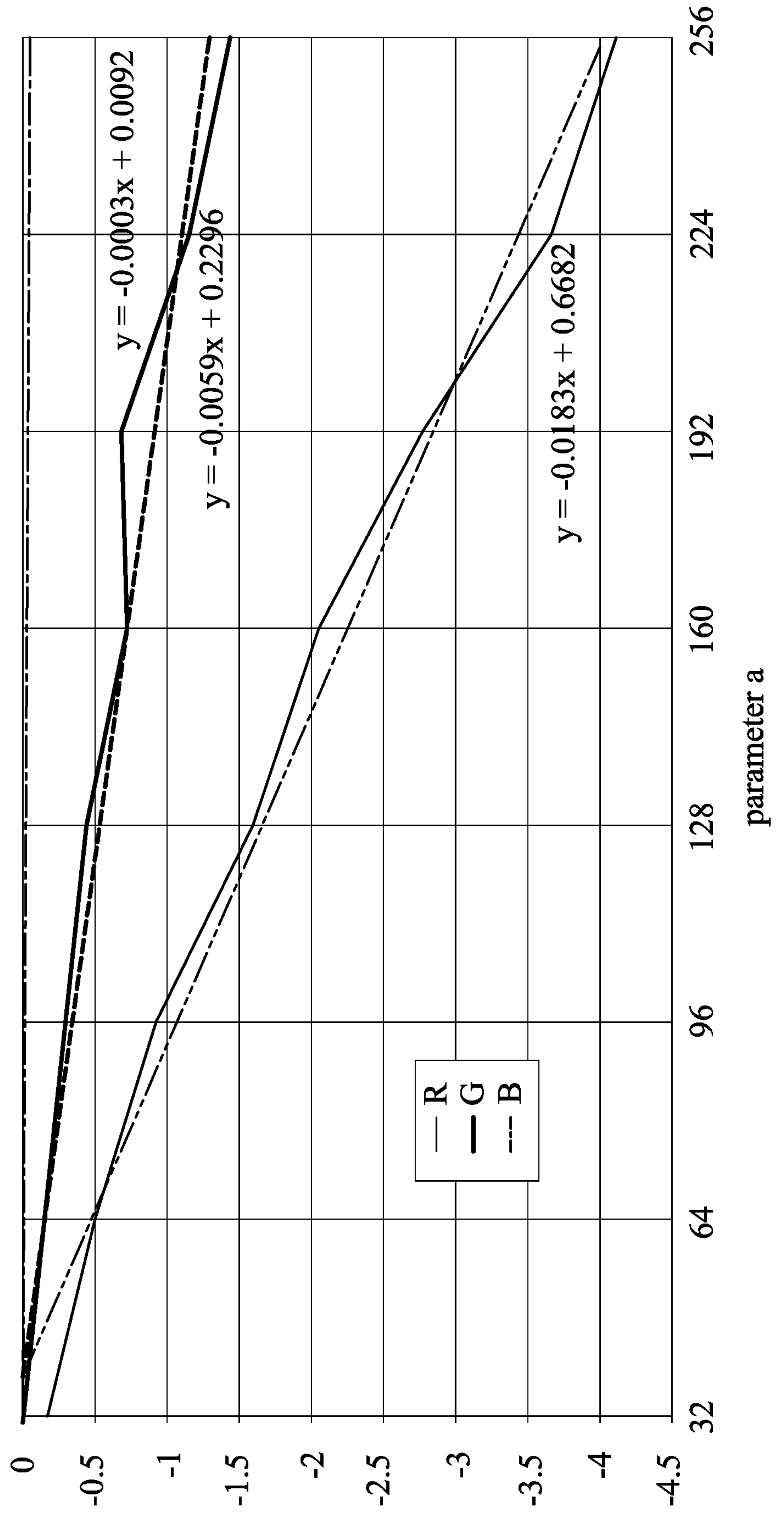
FIG. 10 shows a data diagram of a brightness compensation device according to one embodiment of the present disclosure.
Figure 11:
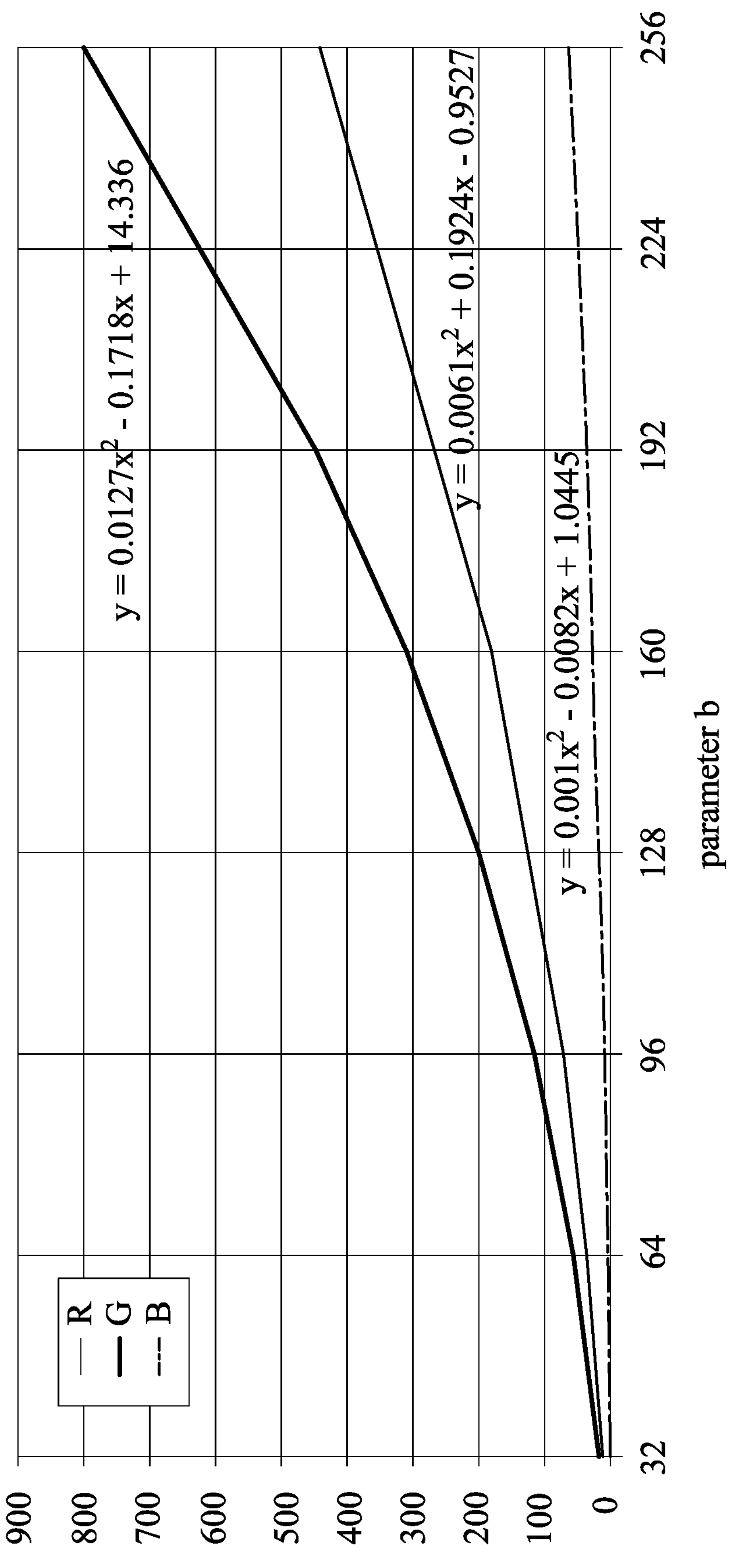
FIG. 11 shows a data diagram of a brightness compensation device according to one embodiment of the present disclosure.
Figure 12:
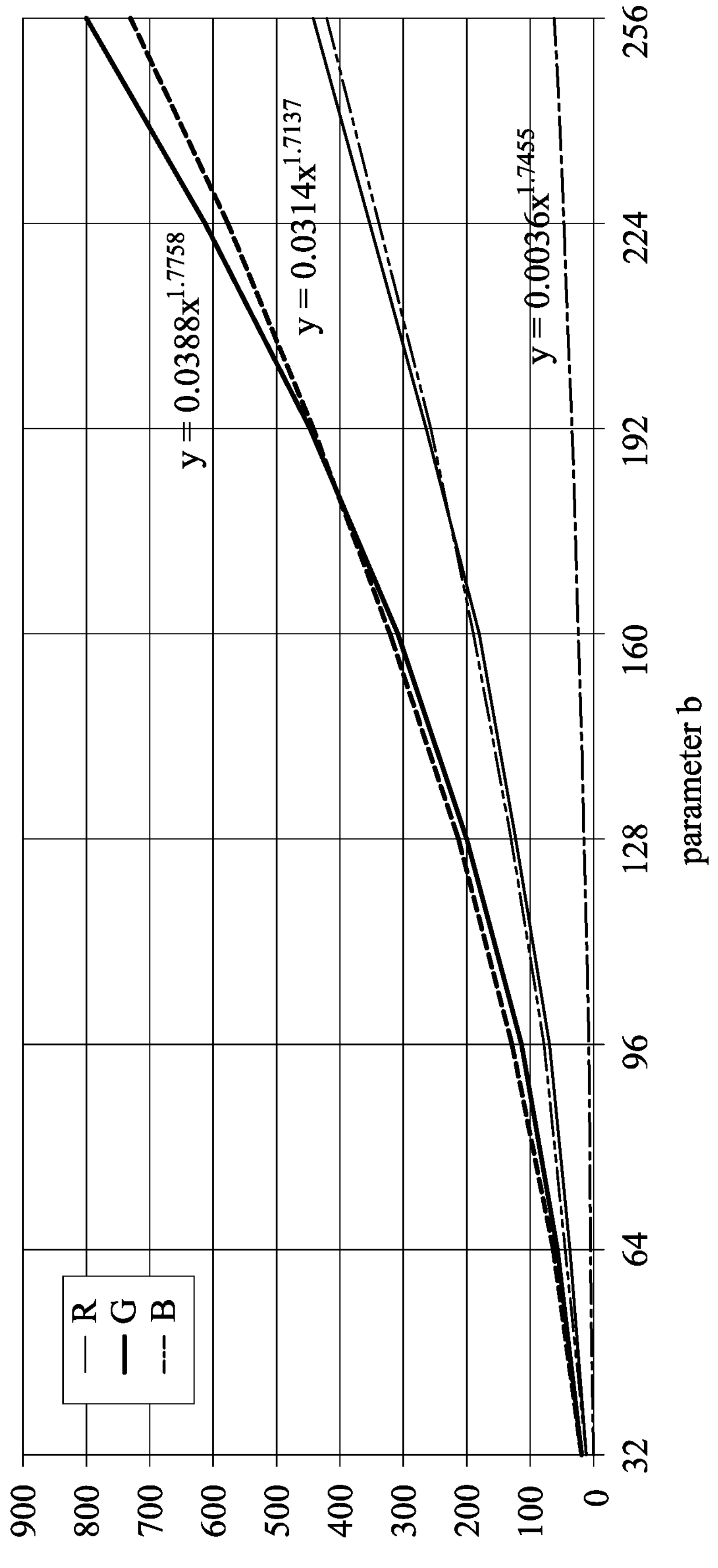
FIG. 12 shows a data diagram of a brightness compensation device according to one embodiment of the present disclosure.
Figure 13:
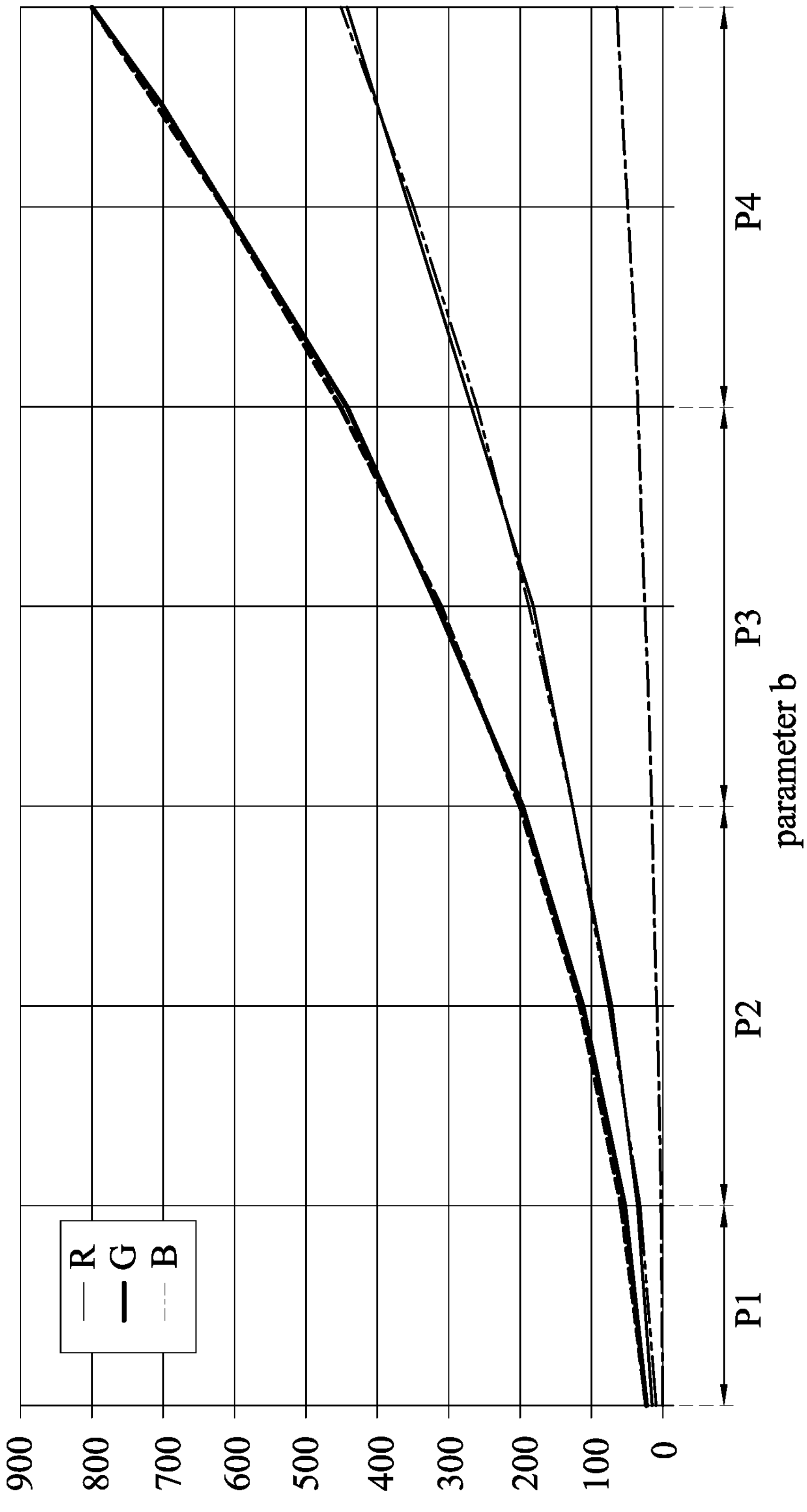
FIG. 13 shows a data diagram of a brightness compensation device according to one embodiment of the present disclosure.

FIG. 9 shows a data diagram of a brightness compensation device according to one embodiment of the present disclosure. FIG. 10 shows a data diagram of a brightness compensation device according to one embodiment of the present disclosure. FIG. 11 shows a data diagram of a brightness compensation device according to one embodiment of the present disclosure. FIG. 12 shows a data diagram of a brightness compensation device according to one embodiment of the present disclosure. FIG. 13 shows a data diagram of a brightness compensation device according to one embodiment of the present disclosure.

Please refer to FIG. 1, FIG. 9 to FIG. 13, in some embodiments, FIG. 9 can be curves which are the specific grayscale (such as 96, 192, and 255 grayscale) of the red grayscale data R1 or R2 corresponding to brightness at different temperatures (such as 24 to 48 degrees), and the curves which are the above specific grayscale corresponding to brightness at different temperatures (that is, the brightness relation) can present a linear relationship, but the present disclosure is not limited to this embodiment.

In one embodiment, the brightness relation is related to a linear equation. For example, the brightness relation can be formed by the linear equation, as detailed below.

$$L = a(T_{RT} + \Delta T_{GL}) + b. \qquad \text{Formula 1}$$

As mentioned above, L can be a brightness, GL can be a grayscale value, $T_{RT}$ can be an ambient temperature, $\Delta T_{GL}$ can be a rising temperature of this grayscale. Please refer to FIG. 10 and FIG. 11 together, in some embodiments, from FIG. 10 it can see that a=mGL+n, from FIG. 11 it can see that $b=sGL^2+pGL+q$, the following Formula 2 can be obtained by fitting the above a and b into Formula 1, and detailed description is as bellows.

$$L = (mGL + n) \times (T_{RT} + \Delta T_{GL}) + sGL^2 + pGL + q. \qquad \text{Formula 2}$$

As mentioned above, in some embodiments, m can be −0.0183, n can be 0.6682, s can be 0.0061, p can be 0.1924, and q can be −0.9527. Besides, when GL is 128 grayscale, $\Delta T_{GL}$ is 10 degrees and $T_{RT}$ is 30 degrees under 128 grayscale, L is 56.65 nits. When GL is 128 grayscale, $\Delta T_{GL}$ is 10 degrees and $T_{RT}$ is 50 degrees under 128 grayscale, L is 23.16 nits.

Please refer to FIG. 10 and FIG. 12 together, in some embodiments, it can be seen a=mGL+n from FIG. 10, it can be seen $b=sGL^p$ from FIG. 12, the following Formula 3 can be obtained by fitting the above a and b into Formula 1, and detailed description is as bellows.

$$L = (mGL + n) \times (T_{RT} + \Delta T_{GL}) + sGL^p. \qquad \text{Formula 3}$$

As mentioned above, In some embodiments, m can be −0.0183, n can be 0.6682, s can be 0.00314, and p can be 1.7137. Besides, when GL is 128 grayscale, $\Delta T_{GL}$ is 10 degrees and $T_{RT}$ is 30 degrees under 128 grayscale, L is 61.28 nits. When GL is 128 grayscale, $\Delta T_{GL}$ is 10 degrees and $T_{RT}$ is 50 degrees under 128 grayscale, L is 27.8 nits.

In one embodiment, please refer to FIG. 10 and FIG. 13, the brightness relation is related to a plurality of intervals P1 to P4 and a plurality of linear relations corresponding to each of the plurality of intervals. For example, the brightness relation can be formed of a plurality of linear relations, and detailed description is as bellows.

In some embodiments, it can be seen a=mGL+n from FIG. 10, the following Formula 4 can be obtained by fitting the above a into Formula 1, and detailed description is as bellows.

$$L = (mGL + n) \times (T_{RT} + \Delta T_{GL}) + b. \qquad \text{Formula 4}$$

Besides, it can be seen that b has its corresponding linear relation in the plurality of intervals P1 to P4 from FIG. 13.

In the interval P4, $$b=iGL+j. \quad \text{Formula 5}$$

In the interval P3, $$b=kGL+I. \quad \text{Formula 6}$$

In the interval P2, $$b=gGL+h. \quad \text{Formula 7}$$

In the interval P1, $$b=fGL+r. \quad \text{Formula 8}$$

In some embodiments, in Formula 4 and Formula 5, the interval P4 can be 192 to 255 grayscale, m can be −0.0183, n can be 0.6682, i can be 2.757, and j can be −263.29, but the present disclosure is not limited to this embodiment.

In some embodiments, in Formula 4 and Formula 6, the interval P3 can be 128 to 191 grayscale, m can be −0.0183, n can be 0.6682, k can be 2.2133, and I can be −154.01, but the present disclosure is not limited to this embodiment. Besides, when GL is 128 grayscale, $\Delta T_{GL}$ is 10 degrees and $T_{RT}$ is 30 degrees under 128 grayscale, L is 62.32 nits. When GL is 128 grayscale, $\Delta T_{GL}$ is 10 degrees and $T_{RT}$ is 50 degrees under 128 grayscale, L is 28.84 nits.

In some embodiments, in Formula 4 and Formula 7, the interval P2 can be 64 to 127 grayscale, m can be −0.0183, n can be 0.6682, g can be 1.3719, and h can be −54.667, but the present disclosure is not limited to this embodiment.

In some embodiments, in Formula 4 and Formula 8, the interval P1 can be 0 to 63 grayscale, m can be −0.0183, n can be 0.6682, f can be 0.5688, and r can be −1.6333, but the present disclosure is not limited to this embodiment.

In one embodiment, the processor 132 is further used to perform the following steps according to the plurality of commands of the memory 131: obtaining a red brightness decreasing amplitude, a green brightness decreasing amplitude, or a blue brightness decreasing amplitude according to the brightness relation and a temperature variation; and setting the turn-on time h1 of the luminous signal EM1 according to a power limit of the panel 110 to compensate for the red brightness decreasing amplitude, the green brightness decreasing amplitude, or the blue brightness decreasing amplitude. For example, the brightness relation can be the above Formula 1 to 4, the temperature variation can be $\Delta T_{GL}$, the processor 132 can compensate for the red brightness decreasing amplitude, the green brightness decreasing amplitude, or the blue brightness decreasing amplitude by adjusting the turn-on time h1 (such as adjusting to the turn-on time h2) within the power limit of the panel 110 (such as the power is 200 watts), so as to achieve the brightness target, but the present disclosure is not limited to this embodiment.

In some embodiments, the red brightness decreasing amplitude can be 10 grayscale, the green brightness decreasing amplitude can be 7 grayscale, and the blue brightness decreasing amplitude can be 5 grayscale, but the present disclosure is not limited to this embodiment.

$$L_{new}=L_{origin}\times(EM_{new}/EM_{origin}). \quad \text{Formula 9}$$

In some embodiments, the processor 132 can use Formula 9 to calculate the grayscale values (or brightness) required for the red, green, and blue target brightness under the luminous signal EM2 (or the luminous signal EM1), but the present disclosure is not limited to this embodiment.

Figure 14:
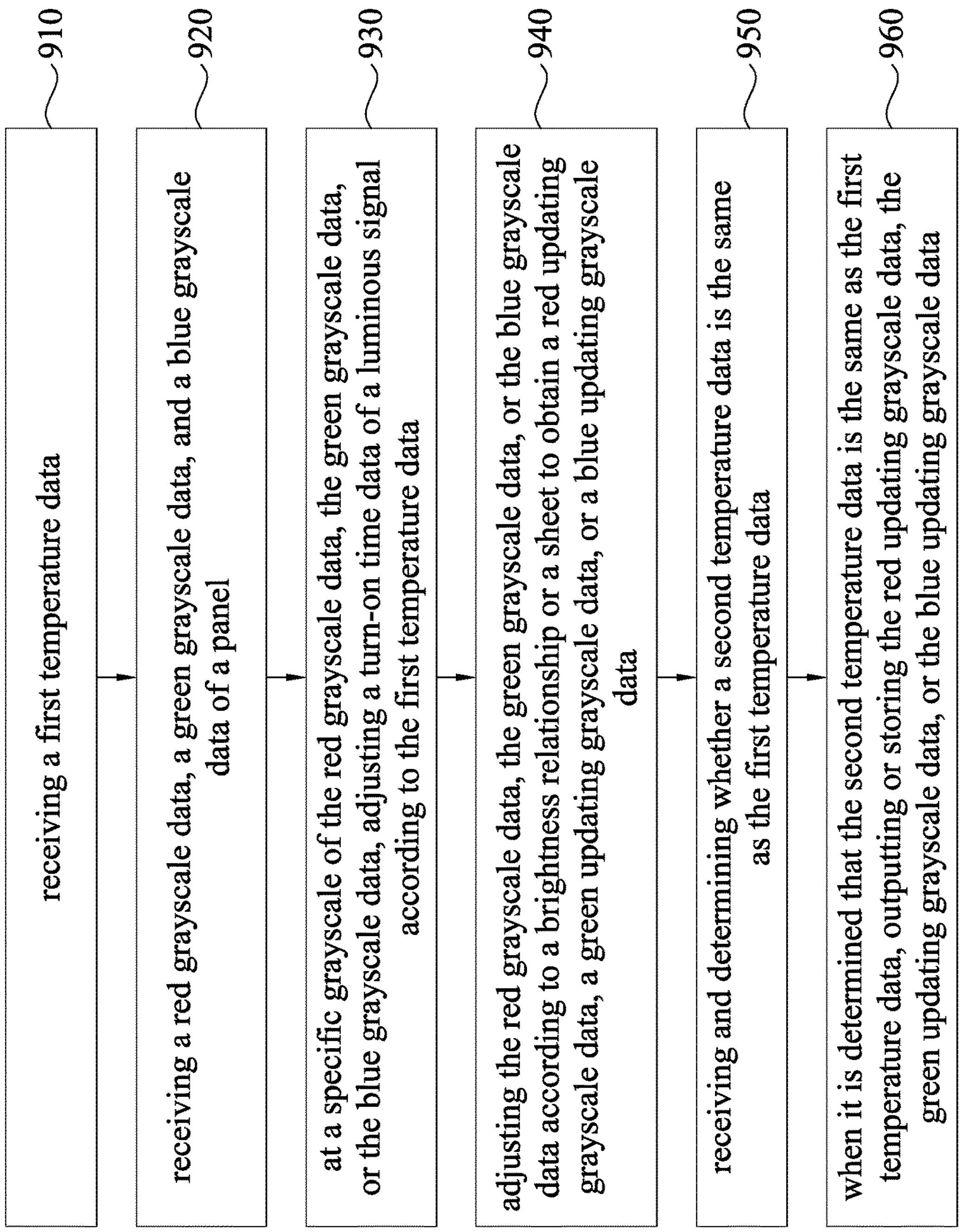
FIG. 14 shows a flowchart of brightness compensation method according to one embodiment of the present disclosure.

FIG. 14 shows a flowchart of brightness compensation method according to one embodiment of the present disclosure. In order to make the brightness compensation method 900 shown in FIG. 14 easy to understand, please refer to FIG. 1 to FIG. 8B, and FIG. 14. The steps of the brightness compensation method 900 of FIG. 14 are described in detail below.

In step 910, receiving a first temperature data. In one embodiment, the first temperature data T1 can be received by the processor 132. For example, the operations of the brightness compensation method 900 are similar to the operations of the brightness compensation device 100 of FIG. 1, and the descriptions regarding the other operations of the brightness compensation method 900 will be omitted herein for the sake of brevity.

In step 920, receiving a red grayscale data, a green grayscale data, and a blue grayscale data of a panel. In one embodiment, the red grayscale data R1, the green grayscale data G1, and the blue grayscale data B1 (as shown in FIG. 2) of the panel 110 can be received by the processor 132. For example, the operations of the brightness compensation method 900 are similar to the operations of the brightness compensation device 100 of FIG. 1, and the descriptions regarding the other operations of the brightness compensation method 900 will be omitted herein for the sake of brevity.

In step 930, at a specific grayscale of the red grayscale data, the green grayscale data, or the blue grayscale data, adjusting a turn-on time data of a luminous signal according to the first temperature data. In one embodiment, at the specific grayscale of the red grayscale data R1, the green grayscale data G1, or the blue grayscale data B1, the turn-on time data h1 of the luminous signal EM1 (as shown in FIG. 3A) according to the first temperature data T1 can be adjusted by processor 132. For example, the operations of the brightness compensation method 900 are similar to the operations of the brightness compensation device 100 of FIG. 1, and the descriptions regarding the other operations of the brightness compensation method 900 will be omitted herein for the sake of brevity.

In step 940, adjusting the red grayscale data, the green grayscale data, or the blue grayscale data according to a brightness relationship or a sheet to obtain a red updating grayscale data, a green updating grayscale data, or a blue updating grayscale data. In one embodiment, the red grayscale data R2 (as shown in FIG. 3B), the green grayscale data G2, or the blue grayscale data B2 can be adjusted by the processor 132 according to the brightness relationship or the sheet to obtain the red updating grayscale data R3 (as shown in FIG. 6), the green updating grayscale data G3, or the blue updating grayscale data B3. For example, the operations of the brightness compensation method 900 are similar to the operations of the brightness compensation device 100 of FIG. 1, and the descriptions regarding the other operations of the brightness compensation method 900 will be omitted herein for the sake of brevity.

In step 950, receiving and determining whether a second temperature data is the same as the first temperature data. In one embodiment, the processor 132 can receive and determine whether the second temperature data T2 is the same as the first temperature data T1. For example, the operations of the brightness compensation method 900 are similar to the operations of the brightness compensation device 100 of FIG. 1, and the descriptions regarding the other operations of the brightness compensation method 900 will be omitted herein for the sake of brevity.

In step 960, when it is determined that the second temperature data is the same as the first temperature data, outputting or storing the red updating grayscale data, the green updating grayscale data, or the blue updating grayscale data. In one embodiment, when it is determined that the second temperature data T2 is the same as the first temperature data T1, the red updating grayscale data R3, the green updating grayscale data G3, or the blue updating grayscale data B3 can be outputted or stored by the processor 132. For example, the operations of the brightness compensation method 900 are similar to the operations of the brightness compensation device 100 of FIG. 1, and the descriptions regarding the other operations of the brightness compensation method 900 will be omitted herein for the sake of brevity.

In some embodiments, please refer to the step 950 together, if after executing the step 950, it is determined that the second temperature data and the first temperature data are not the same, then go back and execute the steps 910 to 950 until it is determined that the second temperature data and the first temperature data are the same, then execute the step 960, but the present disclosure is not limited to this embodiment.

In one embodiment, the first temperature data T1 includes at least one of a panel temperature data and an environment temperature data, and the red updating grayscale data R3, the green updating grayscale data G3, or the blue updating grayscale data B3 is related to a gamma (such as gamma 2.2) curve data. For example, the operations of the brightness compensation method 900 are similar to the operations of the brightness compensation device 100 of FIG. 1, and the descriptions regarding the other operations of the brightness compensation method 900 will be omitted herein for the sake of brevity.

In one embodiment, please refer to the step 930 together, the step of at the specific grayscale of the red grayscale data R1, the green grayscale data G1, or the blue grayscale data B1, the turn-on time data h1 of the luminous signal EM1 (as shown in FIG. 3A) can be adjusted by the processor 132 according to the first temperature data T1 comprises: selecting the specific grayscale R32 of the red grayscale data R1 according to a power limit of the panel 110; at the first temperature data T1, the specific grayscale R32 of the red grayscale data R1 is compensated to a target brightness (such as the grayscale data RGB1) corresponding to the red grayscale data R1 according to a first turn-on time h1; at a second temperature data T2, the specific grayscale R32 of the red grayscale data R1 is compensated to the target brightness (such as the grayscale data RGB1) corresponding to the red grayscale data according to a second turn-on time h2; and recording the first turn-on time h1 and the second turn-on time h2 in a turn-on schedule (as shown in Table 1) of the sheet. For example, the operations of the brightness compensation method 900 are similar to the operations of the brightness compensation device 100 of FIG. 1, and the descriptions regarding the other operations of the brightness compensation method 900 will be omitted herein for the sake of brevity.

In one embodiment, please refer to the step 940 together, the step of the red grayscale data R2 (as shown in FIG. 3B), the green grayscale data G2, or the blue grayscale data B2 can be adjusted by the processor 132 according to the brightness relationship or the sheet to obtain the red updating grayscale data R3 (as shown in FIG. 6), the green updating grayscale data G3, or the blue updating grayscale data B3 comprises: at a first setting of the first temperature data T1 and the first turn-on time h1, adjusting the red grayscale data R2 to a first compensating grayscale data R3; at the first setting, adjusting the green grayscale data G2 to a second compensating grayscale data G3; at the first setting, adjusting the blue grayscale data B2 to a third compensating grayscale data B3; and recording the first compensating grayscale data R3, the second compensating grayscale data G3, or the third compensating grayscale data B3 in a compensating grayscale sheet of the sheet (as shown in Table 2, Table 3 and Table 4), and the first compensating grayscale data R3, the second compensating grayscale data G3, and the third compensating grayscale data B3 are related to a gamma curve data (such as the gamma 2.2 curve). For example, the operations of the brightness compensation method 900 are similar to the operations of the brightness compensation device 100 of FIG. 1, and the descriptions regarding the other operations of the brightness compensation method 900 will be omitted herein for the sake of brevity.

In one embodiment, please refer to the step 940, the step of the red grayscale data R2 (as shown in FIG. 3B), the green grayscale data G2, or the blue grayscale data B2 can be adjusted by the processor 132 according to the brightness relationship or the sheet to obtain the red updating grayscale data R3 (as shown in FIG. 6), the green updating grayscale data G3, or the blue updating grayscale data B3 further comprises: at a second setting of the second temperature data T2 and the second turn-on time h2, adjusting the red grayscale data R2 to a fourth compensating grayscale data R3; at the second setting, adjusting the green grayscale data G2 to a fifth compensating grayscale data G3; at the second setting, adjusting the blue grayscale data B2 to a sixth compensating grayscale data B3 according to an adjustment algorithm; recording the fourth compensating grayscale data R3, the fifth compensating grayscale data G3, or the sixth compensating grayscale data B3 in the compensating grayscale sheet (as shown in Table 2, Table 3, and Table 4), and the fourth compensating grayscale data R3, the fifth compensating grayscale data G3, the sixth compensating grayscale data B3 are related to the gamma curve data; receiving a white grayscale data of the panel 110 and determining whether the white grayscale data is close to a white brightness chromaticity target value; and when it is determined that the white grayscale data is close to the white brightness chromaticity target value, outputting the compensating grayscale sheet (as shown in Table 2, Table 3, and Table 4). For example, the operations of the brightness compensation method 900 are similar to the operations of the brightness compensation device 100 of FIG. 1, and the descriptions regarding the other operations of the brightness compensation method 900 will be omitted herein for the sake of brevity.

In some embodiments, please refer to the step 940 together, the step of the red grayscale data R2 (as shown in FIG. 3B), the green grayscale data G2, or the blue grayscale data B2 can be adjusted by the processor 132 according to the brightness relationship or the sheet to obtain the red updating grayscale data R3 (as shown in FIG. 6), the green updating grayscale data G3, or the blue updating grayscale data B3 further comprises: when it is determined that the white grayscale data is not close to the white brightness chromaticity target value, fine tune the red updating grayscale data R3, the green updating grayscale data G3, or the blue updating grayscale data B3 until the white grayscale data is close to the white brightness chromaticity target value; and outputting the compensating grayscale sheet (as shown in Table 2, Table 3, and Table 4). For example, the processor 132 can continuously fine tune the red updating grayscale data R3, the green updating grayscale data G3, or the blue updating grayscale data B3 until the white grayscale data is close to the white brightness chromaticity target value, but the present disclosure is not limited to this embodiment.

In one embodiment, please refer to the step 930 together, the step of at the specific grayscale of the red grayscale data R1, the green grayscale data G1, or the blue grayscale data B1, the turn-on time data h1 of the luminous signal EM1 (as shown in FIG. 3A) can be adjusted by the processor 132 according to the first temperature data T1 comprises: at the specific grayscale (such as 32 grayscale) of the red grayscale data R1, the green grayscale data G2, or the blue grayscale data B2, adjusting the turn-on time h1 of the luminous signal EM1 according to the sheet (such as Table 1). For example, the operations of the brightness compensation method 900 are similar to the operations of the brightness compensation device 100 of FIG. 1, and the descriptions regarding the other operations of the brightness compensation method 900 will be omitted herein for the sake of brevity.

In one embodiment, the brightness compensation method 900 further includes the following steps: setting a plurality of target brightness corresponding to the red grayscale data R1, the green grayscale data G1, or the blue grayscale data B1. For example, the operations of the brightness compensation method 900 are similar to the operations of the brightness compensation device 100 of FIG. 1, and the descriptions regarding the other operations of the brightness compensation method 900 will be omitted herein for the sake of brevity.

In one embodiment, the brightness relation is related to a linear equation. For example, the operations of the brightness compensation method 900 are similar to the operations of the brightness compensation device 100 of FIG. 1, and the descriptions regarding the other operations of the brightness compensation method 900 will be omitted herein for the sake of brevity.

In one embodiment, the brightness relation is related to a plurality of intervals P1 to P4 and a plurality of linear relations corresponding to each of the plurality of intervals. For example, the operations of the brightness compensation method 900 are similar to the operations of the brightness compensation device 100 of FIG. 1, and the descriptions regarding the other operations of the brightness compensation method 900 will be omitted herein for the sake of brevity.

In one embodiment, please refer to the step 930 together, the step of at the specific grayscale of the red grayscale data R1, the green grayscale data G1, or the blue grayscale data B1, the turn-on time data h1 of the luminous signal EM1 (as shown in FIG. 3A) can be adjusted by the processor 132 according to the first temperature data T1 comprises: obtaining a red brightness decreasing amplitude, a green brightness decreasing amplitude, or a blue brightness decreasing amplitude according to the brightness relation and a temperature variation; and setting the turn-on time h1 of the luminous signal EM1 according to a power limit of the panel 110 to compensate for the red brightness decreasing amplitude, the green brightness decreasing amplitude, or the blue brightness decreasing amplitude. For example, the operations of the brightness compensation method 900 are similar to the operations of the brightness compensation device 100 of FIG. 1, and the descriptions regarding the other operations of the brightness compensation method 900 will be omitted herein for the sake of brevity.

It can be seen from the above embodiments of the present disclosure that the application of the present disclosure has the following advantages. The brightness compensation device and the brightness compensation method shown in the embodiment of the present disclosure can adjust the brightness and chromaticity of the panel through the brightness relation or the sheet, so that the brightness and chromaticity of the panel still meet standard values when the panel is used for a long time or when the ambient temperature rises.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A brightness compensation device, comprising:
- a panel, comprising:
  - a plurality of light emitting diodes;
- a heat detector, configured to receive a first temperature data and a second temperature data;
- a memory, configured to store a plurality of commands and a sheet; and
- a processor, coupled to the panel, the heat detector, and the memory, wherein according to the plurality of commands of the memory, the processor is configured to:
- receive the first temperature data;
- receive a red grayscale data, a green grayscale data, and a blue grayscale data of the panel;
- adjust a turn-on time data of a luminous signal at a specific grayscale of the red grayscale data, the green grayscale data, or the blue grayscale data, according to the first temperature data;
- adjust the red grayscale data, the green grayscale data, or the blue grayscale data according to a brightness relation or the sheet to obtain a red updating grayscale data, a green updating grayscale data, or a blue updating grayscale data;
- receive and determine whether the second temperature data is the same as the first temperature data; and
- output or store the red updating grayscale data, the green updating grayscale data, or the blue updating grayscale data when it is determined that the second temperature data is the same as the first temperature data.

2. The brightness compensation device of claim 1, wherein the first temperature data comprises at least one of a panel temperature data and an environment temperature data, wherein the red updating grayscale data, the green updating grayscale data, or the blue updating grayscale data is related to a gamma curve data.

3. The brightness compensation device of claim 1, wherein according to the plurality of commands of the memory, the processor is further configured to:

select the specific grayscale of the red grayscale data according to a power limit of the panel;

compensate the specific grayscale of the red grayscale data to a target brightness corresponding to the red grayscale data at the first temperature data, according to a first turn-on time;

compensate the specific grayscale of the red grayscale data to the target brightness corresponding to the red grayscale data at the second temperature data, according to a second turn-on time; and record the first turn-on time and the second turn-on time in a turn-on schedule of the sheet.

4. The brightness compensation device of claim 3, wherein according to the plurality of commands of the memory, the processor is further configured to:

adjust the red grayscale data to a first compensating grayscale data at a first setting of the first temperature data and the first turn-on time;

adjust the green grayscale data to a second compensating grayscale data at the first setting;

adjust the blue grayscale data to a third compensating grayscale data at the first setting; and record the first compensating grayscale data, the second compensating grayscale data, or the third compensating grayscale data in a compensating grayscale sheet of the sheet, wherein the first compensating grayscale data, the second compensating grayscale data, and the third compensating grayscale data are related to a gamma curve data.

5. The brightness compensation device of claim 4, wherein according to the plurality of commands of the memory, the processor is further configured to:

adjust the red grayscale data to a fourth compensating grayscale data of the second setting of the second temperature data and the second turn-on time;

adjust the green grayscale data to a fifth compensating grayscale data at the second setting;

adjust the blue grayscale data to a sixth compensating grayscale data at the second setting, according to an adjustment algorithm;

record the fourth compensating grayscale data, the fifth compensating grayscale data, or the sixth compensating grayscale data in the compensating grayscale sheet, wherein the fourth compensating grayscale data, the fifth compensating grayscale data, the sixth compensating grayscale data are related to the gamma curve data;

receive a white grayscale data of the panel and determine whether the white grayscale data is close to a white brightness chromaticity target value; and outout the compensation grayscale sheet when it is determined that the white grayscale data is close to the white brightness chromaticity target value.

6. The brightness compensation device of claim 1, wherein according to the plurality of commands of the memory, the processor is further configured to:

adjust the turn-on time data of the luminous signal at the specific grayscale of the red grayscale data, the green grayscale data, or the blue grayscale data according to the sheet.

7. The brightness compensation device of claim 1, wherein according to the plurality of commands memory, the processor is further configured to:

set a plurality of target brightness corresponding to the red grayscale data, the green grayscale data, or the blue grayscale data.

8. The brightness compensation device of claim 1, wherein the brightness relation is related to a linear equation.

9. The brightness compensation device of claim 1, wherein the brightness relation is related to a plurality of intervals and a plurality of linear relations corresponding to each of the plurality of intervals.

10. The brightness compensation device of claim 1, wherein according to the plurality of commands of the memory, the processor is further configured to:

obtain a red brightness decreasing amplitude, a green brightness decreasing amplitude, or a blue brightness decreasing amplitude according to the brightness relation and a temperature variation; and set the turn-on time data of the luminous signal according to a power limit of the panel to compensate for the red brightness decreasing amplitude, the green brightness decreasing amplitude, or the blue brightness decreasing amplitude.

11. A brightness compensation method, comprising:

receiving a first temperature data;

receiving a red grayscale data, a green grayscale data, and a blue grayscale data of a panel;

at a specific grayscale of the red grayscale data, the green grayscale data, or the blue grayscale data, adjusting a turn-on time data of a luminous signal according to the first temperature data;

adjusting the red grayscale data, the green grayscale data, or the blue grayscale data according to a brightness relation or a sheet to obtain a red updating grayscale data, a green updating grayscale data, or a blue updating grayscale data;

receiving and determining whether a second temperature data is a same as the first temperature data; and when it is determined that the second temperature data is the same as the first temperature data, outputting or storing the red updating grayscale data, the green updating grayscale data, or the blue updating grayscale data.

12. The brightness compensation method of claim 11, wherein the first temperature data comprises at least one of a panel temperature data and an environment temperature data, wherein the red updating grayscale data, the green updating grayscale data, or the blue updating grayscale data is related to a gamma curve data.

13. The brightness compensation method of claim 11, wherein the step of at the specific grayscale of the red grayscale data, the green grayscale data, or the blue grayscale data, adjusting the turn-on time data of the luminous signal according to the first temperature data comprises:

selecting the specific grayscale of the red grayscale data according to a power limit of the panel;

at the first temperature data, the specific grayscale of the red grayscale data is compensated to a target brightness corresponding to the red grayscale data according to a first turn-on time;

at the second temperature data, the specific grayscale of the red grayscale data is compensated to the target brightness corresponding to the red grayscale data according to a second turn-on time; and recording the first turn-on time and the second turn-on time in a turn-on schedule of the sheet.

14. The brightness compensation method of claim 13, wherein the step of adjusting the red grayscale data, the green grayscale data, or the blue grayscale data according to the brightness relation or the sheet to obtain the red updating grayscale data, the green updating grayscale data, or the blue updating grayscale data comprises:

at the first temperature data and a first setting of the first turn-on time, adjusting the red grayscale data to a first compensating grayscale data;

at the first setting, adjusting the green grayscale data to a second compensating grayscale data;

at the first setting, adjusting the blue grayscale data to a third compensating grayscale data; and recording the first compensating grayscale data, the second compensating grayscale data, or the third compensating grayscale data in a compensating grayscale sheet of the sheet, wherein the first compensating grayscale data, the second compensating grayscale data, and the third compensating grayscale data are related to a gamma curve data.

15. The brightness compensation method of claim 14, wherein the step of adjusting the red grayscale data, the green grayscale data, or the blue grayscale data according to the brightness relation or the sheet to obtain the red updating grayscale data, the green updating grayscale data, or the blue updating grayscale data further comprises:

at the second temperature data and a second setting of the second turn-on time, adjusting the red grayscale data to a fourth compensating grayscale data;

at the second setting, adjusting the green grayscale data to a fifth compensating grayscale data;

at the second setting, adjusting the blue grayscale data to a sixth compensating grayscale data according to an adjustment algorithm;

recording the fourth compensating grayscale data, the fifth compensating grayscale data, or the sixth compensating grayscale data in the compensating grayscale sheet, wherein the fourth compensating grayscale data, the fifth compensating grayscale data, the sixth compensating grayscale data are related to the gamma curve data;

receiving a white grayscale data of the panel and determining whether the white grayscale data is close to a white brightness chromaticity target value; and when it is determined that the white grayscale data is close to the white brightness chromaticity target value, outputting the compensating grayscale sheet.

16. The brightness compensation method of claim 11, wherein the step of at the specific grayscale of the red grayscale data, the green grayscale data, or the blue grayscale data, adjusting the turn-on time data of the luminous signal according to the first temperature data:

at the specific grayscale of the red grayscale data, the green grayscale data, or the blue grayscale data, adjusting the turn-on time data of the luminous signal according to the sheet.

17. The brightness compensation method of claim 11, further comprising:

setting a plurality of target brightness corresponding to the red grayscale data, the green grayscale data, or the blue grayscale data.

18. The brightness compensation method of claim 11, wherein the brightness relation is related to a linear equation.

19. The brightness compensation method of claim 11, wherein the brightness relation is related to a plurality of intervals and a plurality of linear relations corresponding to each of the plurality of intervals.

20. The brightness compensation method of claim 11, wherein the step of at the specific grayscale of the red grayscale data, the green grayscale data, or the blue grayscale data, adjusting the turn-on time data of the luminous signal according to the first temperature data:

obtaining a red brightness decreasing amplitude, a green brightness decreasing amplitude, or a blue brightness decreasing amplitude according to the brightness relation and a temperature variation; and setting the turn-on time data of the luminous signal according to a power limit of the panel to compensate for the red brightness decreasing amplitude, the green brightness decreasing amplitude, or the blue brightness decreasing amplitude.

* * * * *